US008503200B2

(12) United States Patent
Chapman et al.

(10) Patent No.: US 8,503,200 B2
(45) Date of Patent: Aug. 6, 2013

(54) QUADRATURE-CORRECTED FEEDFORWARD CONTROL APPARATUS AND METHOD FOR DC-AC POWER CONVERSION

(75) Inventors: Patrick L. Chapman, Urbana, IL (US); Trishan Esram, Kennewick, WA (US); Eric Martina, Houston, TX (US); Brian Kuhn, Champaign, IL (US)

(73) Assignee: SolarBridge Technologies, Inc., Austin, TX (US)

( * ) Notice: Subject to any disclaimer, the term of this patent is extended or adjusted under 35 U.S.C. 154(b) by 479 days.

(21) Appl. No.: 12/902,049

(22) Filed: Oct. 11, 2010

(65) Prior Publication Data
US 2012/0087159 A1 Apr. 12, 2012

(51) Int. Cl.
H02M 1/12 (2006.01)
H02M 7/04 (2006.01)

(52) U.S. Cl.
USPC .............................. 363/41; 363/97; 363/131

(58) Field of Classification Search
USPC .................... 363/39–41, 95–98, 131–134
See application file for complete search history.

(56) References Cited

U.S. PATENT DOCUMENTS

| | | | |
|---|---|---|---|
| 3,670,230 A | 6/1972 | Rooney et al. |
| 4,114,048 A | 9/1978 | Hull |
| 4,217,633 A | 8/1980 | Evans |
| 4,277,692 A | 7/1981 | Small |
| 4,287,465 A | 9/1981 | Godard et al. |
| 4,651,265 A | 3/1987 | Stacey et al. |
| 4,661,758 A | 4/1987 | Whittaker |
| 4,707,774 A | 11/1987 | Kajita |
| 4,709,318 A | 11/1987 | Gephart et al. |
| 4,719,550 A | 1/1988 | Powell et al. |
| 4,725,740 A | 2/1988 | Nakata |
| 5,041,959 A | 8/1991 | Walker |
| 5,148,043 A | 9/1992 | Hirata et al. |
| 5,160,851 A | 11/1992 | McAndrews |

(Continued)

FOREIGN PATENT DOCUMENTS

| | | |
|---|---|---|
| CA | 2353422 C | 3/2004 |
| CA | 2655007 A1 | 8/2010 |

(Continued)

OTHER PUBLICATIONS

Kutkut, "PV Energy Conversion and System Integration," Florida Energy Systems Consortium, 2009, 24 pages.

(Continued)

*Primary Examiner* — Jessica Han
(74) *Attorney, Agent, or Firm* — Barnes & Thornburg LLP

(57) ABSTRACT

An apparatus and method for controlling the delivery of a pre-determined amount of power from a DC source to an AC grid includes an inverter and an inverter controller. The inverter includes an input converter, an energy storage capacitor, and an output converter. The inverter controller includes an input converter controller and an output converter controller. The input converter controller includes feedforward controller configured to perform a calculation to determine a value for the duty cycle for the input converter such that: (1) the input converter delivers the pre-determined amount of power and (2) the magnitude of a ripple signal reflected into the input source is attenuated toward zero. The input converter controller may also include a quadrature corrector configured to determine the effectiveness of the calculation in attenuating the ripple and to adaptively alter the calculation to improve the effectiveness.

39 Claims, 19 Drawing Sheets

U.S. PATENT DOCUMENTS

| | | | |
|---|---|---|---|
| 5,191,519 | A | 3/1993 | Kawakami |
| 5,309,073 | A | 5/1994 | Kaneko et al. |
| 5,343,380 | A | 8/1994 | Champlin |
| 5,473,528 | A | 12/1995 | Hirata |
| 5,598,326 | A * | 1/1997 | Liu et al. .......................... 363/34 |
| 5,668,464 | A | 9/1997 | Krein |
| 5,684,385 | A | 11/1997 | Guyonneau et al. |
| 5,721,481 | A | 2/1998 | Narita et al. |
| 5,745,356 | A | 4/1998 | Tassitino |
| 5,796,182 | A | 8/1998 | Martin |
| 5,801,519 | A | 9/1998 | Midya et al. |
| 5,886,890 | A | 3/1999 | Ishida et al. |
| 5,929,537 | A | 7/1999 | Glennon |
| 5,978,236 | A | 11/1999 | Faberman et al. |
| 5,982,645 | A | 11/1999 | Levran et al. |
| 6,046,402 | A | 4/2000 | More |
| 6,154,379 | A | 11/2000 | Okita |
| 6,157,168 | A | 12/2000 | Malik |
| 6,180,868 | B1 | 1/2001 | Yoshino et al. |
| 6,201,180 | B1 | 3/2001 | Meyer et al. |
| 6,201,319 | B1 | 3/2001 | Simonelli et al. |
| 6,225,708 | B1 | 5/2001 | Furukawa |
| 6,268,559 | B1 | 7/2001 | Yamawaki |
| 6,285,572 | B1 | 9/2001 | Onizuka et al. |
| 6,291,764 | B1 | 9/2001 | Ishida et al. |
| 6,311,279 | B1 | 10/2001 | Nguyen |
| 6,356,471 | B1 | 3/2002 | Fang |
| 6,369,461 | B1 | 4/2002 | Jungreis et al. |
| 6,381,157 | B2 | 4/2002 | Jensen |
| 6,445,089 | B1 | 9/2002 | Okui |
| 6,462,507 | B2 | 10/2002 | Fisher |
| 6,489,755 | B1 | 12/2002 | Boudreaux et al. |
| 6,563,234 | B2 | 5/2003 | Hasegawa et al. |
| 6,605,881 | B2 | 8/2003 | Takehara et al. |
| 6,614,132 | B2 | 9/2003 | Hockney et al. |
| 6,624,533 | B1 | 9/2003 | Swanson |
| 6,657,321 | B2 | 12/2003 | Sinha |
| 6,700,802 | B2 | 3/2004 | Ulinski et al. |
| 6,727,602 | B2 | 4/2004 | Olson |
| 6,750,391 | B2 | 6/2004 | Bower et al. |
| 6,765,315 | B2 | 7/2004 | Hammerstrom |
| 6,770,984 | B2 | 8/2004 | Pai |
| 6,795,322 | B2 | 9/2004 | Aihara et al. |
| 6,838,611 | B2 | 1/2005 | Kondo et al. |
| 6,847,196 | B2 | 1/2005 | Garabandic |
| 6,881,509 | B2 | 4/2005 | Jungreis |
| 6,882,063 | B2 | 4/2005 | Droppo et al. |
| 6,950,323 | B2 | 9/2005 | Achleitner |
| 7,031,176 | B2 | 4/2006 | Kotsopoulos et al. |
| 7,072,195 | B2 | 7/2006 | Xu |
| 7,091,707 | B2 | 8/2006 | Cutler |
| 7,193,872 | B2 | 3/2007 | Siri |
| 7,233,130 | B1 | 6/2007 | Kay |
| 7,289,341 | B2 | 10/2007 | Hesterman |
| 7,319,313 | B2 | 1/2008 | Dickerson et al. |
| 7,324,361 | B2 | 1/2008 | Siri |
| 7,339,287 | B2 | 3/2008 | Jepsen et al. |
| 7,365,998 | B2 | 4/2008 | Kumar |
| 7,405,494 | B2 | 7/2008 | Tassitino, Jr. et al. |
| 7,420,354 | B2 | 9/2008 | Cutler |
| 7,432,691 | B2 | 10/2008 | Cutler |
| 7,463,500 | B2 | 12/2008 | West |
| 7,502,697 | B2 | 3/2009 | Holmquist et al. |
| 7,521,914 | B2 | 4/2009 | Dickerson et al. |
| 7,531,993 | B2 | 5/2009 | Udrea et al. |
| 7,551,460 | B2 | 6/2009 | Lalithambika et al. |
| 7,577,005 | B2 | 8/2009 | Angerer et al. |
| 7,592,789 | B2 | 9/2009 | Jain |
| 7,609,040 | B1 | 10/2009 | Jain |
| 7,626,834 | B2 | 12/2009 | Chisenga et al. |
| 7,638,899 | B2 | 12/2009 | Tracy et al. |
| 7,646,116 | B2 | 1/2010 | Batarseh et al. |
| 7,660,139 | B2 | 2/2010 | Garabandic |
| 7,667,610 | B2 | 2/2010 | Thompson |
| 7,710,752 | B2 | 5/2010 | West |
| 7,733,679 | B2 | 6/2010 | Luger et al. |
| 7,768,155 | B2 | 8/2010 | Fornage |
| 7,796,412 | B2 | 9/2010 | Fornage |
| RE41,965 | E | 11/2010 | West |
| 7,839,022 | B2 | 11/2010 | Wolfs |
| 7,855,906 | B2 | 12/2010 | Klodowski et al. |
| RE42,039 | E | 1/2011 | West et al. |
| 7,899,632 | B2 | 3/2011 | Fornage et al. |
| 7,916,505 | B2 | 3/2011 | Fornage |
| 2001/0043050 | A1 | 11/2001 | Fisher |
| 2002/0017822 | A1 | 2/2002 | Umemura et al. |
| 2002/0196026 | A1 | 12/2002 | Kimura et al. |
| 2005/0213272 | A1 | 9/2005 | Kobayashi |
| 2006/0067137 | A1 | 3/2006 | Udrea |
| 2006/0083039 | A1 | 4/2006 | Oliveira |
| 2007/0040539 | A1 | 2/2007 | Cutler |
| 2007/0040540 | A1 | 2/2007 | Cutler |
| 2007/0133241 | A1 | 6/2007 | Mumtaz et al. |
| 2007/0221267 | A1 | 9/2007 | Fornage |
| 2008/0055952 | A1 | 3/2008 | Chisenga et al. |
| 2008/0078436 | A1 | 4/2008 | Nachamkin et al. |
| 2008/0106921 | A1 | 5/2008 | Dickerson et al. |
| 2008/0203397 | A1 | 8/2008 | Amaratunga et al. |
| 2008/0266922 | A1 | 10/2008 | Mumtaz et al. |
| 2008/0272279 | A1 | 11/2008 | Thompson |
| 2008/0283118 | A1 | 11/2008 | Rotzoll et al. |
| 2008/0285317 | A1 | 11/2008 | Rotzoll |
| 2008/0304296 | A1 | 12/2008 | NadimpalliRaju et al. |
| 2009/0000654 | A1 | 1/2009 | Rotzoll et al. |
| 2009/0020151 | A1 | 1/2009 | Fornage |
| 2009/0066357 | A1 | 3/2009 | Fornage |
| 2009/0079383 | A1 | 3/2009 | Fornage et al. |
| 2009/0080226 | A1 | 3/2009 | Fornage |
| 2009/0084426 | A1 | 4/2009 | Fornage et al. |
| 2009/0086514 | A1 | 4/2009 | Fornage et al. |
| 2009/0097283 | A1 | 4/2009 | Krein et al. |
| 2009/0147554 | A1 | 6/2009 | Adest et al. |
| 2009/0184695 | A1 | 7/2009 | Mocarski |
| 2009/0200994 | A1 | 8/2009 | Fornage |
| 2009/0225574 | A1 | 9/2009 | Fornage |
| 2009/0230782 | A1 | 9/2009 | Fornage |
| 2009/0242272 | A1 | 10/2009 | Little et al. |
| 2009/0243587 | A1 | 10/2009 | Fornage |
| 2009/0244929 | A1 | 10/2009 | Fornage |
| 2009/0244939 | A1 | 10/2009 | Fornage |
| 2009/0244947 | A1 | 10/2009 | Fornage |
| 2009/0296348 | A1 | 12/2009 | Russell et al. |
| 2010/0085035 | A1 | 4/2010 | Fornage |
| 2010/0088052 | A1 | 4/2010 | Yin et al. |
| 2010/0091532 | A1 | 4/2010 | Fornage |
| 2010/0106438 | A1 | 4/2010 | Fornage |
| 2010/0139945 | A1 | 6/2010 | Dargatz |
| 2010/0175338 | A1 | 7/2010 | Garcia Cors |
| 2010/0176771 | A1 | 7/2010 | Fieldhouse et al. |
| 2010/0181830 | A1 | 7/2010 | Fornage et al. |
| 2010/0195357 | A1 | 8/2010 | Fornage et al. |
| 2010/0214808 | A1 | 8/2010 | Rodriguez |
| 2010/0222933 | A1 | 9/2010 | Smith et al. |
| 2010/0236612 | A1 | 9/2010 | Khajehoddin et al. |
| 2010/0263704 | A1 | 10/2010 | Fornage et al. |
| 2010/0283325 | A1 | 11/2010 | Marcianesi et al. |
| 2010/0309695 | A1 | 12/2010 | Fornage |
| 2011/0012429 | A1 | 1/2011 | Fornage |
| 2011/0019444 | A1 | 1/2011 | Dargatz et al. |
| 2011/0026281 | A1 | 2/2011 | Chapman et al. |
| 2011/0026282 | A1 | 2/2011 | Chapman et al. |
| 2011/0043160 | A1 | 2/2011 | Serban |
| 2011/0049990 | A1 | 3/2011 | Amaratunga et al. |
| 2011/0051820 | A1 | 3/2011 | Fornage |
| 2011/0130889 | A1 | 6/2011 | Khajehoddin et al. |
| 2011/0222326 | A1* | 9/2011 | Gray et al. .................... 363/132 |

FOREIGN PATENT DOCUMENTS

| | | | |
|---|---|---|---|
| CA | 2693737 | A1 | 8/2010 |
| DE | 20012131 | U1 | 3/2001 |
| EP | 1794799 | A1 | 6/2007 |
| EP | 1803161 | A1 | 7/2007 |
| EP | 1837985 | A2 | 9/2007 |
| GB | 2419968 | A | 5/2006 |
| GB | 2421847 | A | 7/2006 |
| GB | 2439648 | A | 1/2008 |
| GB | 2434490 | B | 4/2009 |

| | | | |
|---|---|---|---|
| GB | 2454389 A | 5/2009 | |
| GB | 2455753 A | 6/2009 | |
| GB | 2455755 A | 6/2009 | |
| NL | 1021582 C2 | 4/2004 | |
| NL | 1021591 C2 | 4/2004 | |
| WO | WO 2004008619 A2 | 1/2004 | |
| WO | WO 2004100348 A1 | 11/2004 | |
| WO | WO 2004100348 A8 | 12/2005 | |
| WO | WO 2006048688 A1 | 5/2006 | |
| WO | WO 2007080429 A2 | 7/2007 | |
| WO | WO 2009081205 A2 | 7/2009 | |
| WO | WO 2009081205 A3 | 10/2009 | |
| WO | WO 2009134756 A1 | 11/2009 | |

OTHER PUBLICATIONS

Kwon et al., "High-efficiency Module-integrated Photovoltaic Power Conditioning System," IET Power Electronics, doi: 10.1049/iet-pel.2008.0023, 2008.

Lohner et al., "A New Panel-integratable Inverter Concept for Grid-Connected Photovoltaic Systems," IEEE ISIE '96, vol. 2, pp. 827-831, 1996.

Martins et al., "Analysis of Utility Interactive Photovoltaic Generation System Using a Single Power Static Inverter," Conference Record of the Twenty-Eighth IEEE Photovoltaic Specialists Conference, pp. 1719-1722, 2000.

Martins et al., "Interconnection of a Photovoltaic Panels Array to a Single-Phase Utility Line From a Static Conversion System," Proc. IEEE Power Electronics Specialists Conf., pp. 1207-1211, 2000.

Martens et al., "Usage of the Solar Energy from the Photovoltaic Panels for the Generation of Electrical Energy," The 21st International Telecommunication Energy Conference, 6 pages, 1999.

Matsui et al, "A New Maximum Photovoltaic Power Tracking Control Scheme Based on Power Equilibrium at DC Link," Conference Record of the 1999 IEEE Thirty-Fourth IAS Annual Meeting, vol. 2, pp. 804-809, 1999.

Meinhardt et al., "Miniaturised 'low profile' Module Integrated Converter for Photovoltaic Applications with Integrated Magnetic Components," IEEE APEC '99, vol. 1, pp. 305-311, 1999.

Meza et al., "Boost-Buck Inverter Variable Structure Control for Grid-Connected Photovoltaic Systems," IEEE International Symposium on Circuits and Systems, vol. 2, pp. 1318-1321, 2005.

Midya et al., "Dual Switched Mode Power Converter," 15th Annual Conference of IEEE Industrial Electronics Society, vol. 1, pp. 155-158, Mar. 1989.

Midya et al., "Sensorless Current Mode Control—An Observer-Based Technique for DC-DC Converters," IEEE Transactions on Power Electronics, vol. 16, No. 4, pp. 522-526, Jul. 2001.

Nikraz et al., "Digital Control of a Voltage Source Inverter in Photovoltaic Applications," 35th Annual IEEE Power Electronics Specialists Conference, pp. 3266-3271, 2004.

Oldenkamp et al., "AC Modules: Past, Present and Future, Workshop Installing the Solar Solution," Jan. 1998, Hatfield, UK, 6 pages.

Pajic et al., "Unity Power Factor Compensation for Burst Modulated Loads," IEEE Power Engineering Society General Meeting, vol. 2, pp. 1274-1277, 2003.

Ramos et al., "A Fixed-Frequency Quasi-Sliding Control Algorithm: Application to Power Inverters Design by Means of FPGA Implementation," IEEE Transactions on Power Electronics, vol. 18, No. 1, pp. 344-355, Jan. 2003.

Rodriguez et al., "Analytic Solution to the Photovoltaic Maximum Power Point Problem," IEEE Transactions on Circuits and Systems, vol. 54, No. 9, pp. 2054-2060, Sep. 2007.

Rodriguez et al., "Dynamic Stability of Grid-Connected Photovoltaic Systems," Power Engineering Society General Meeting, vol. 2, pp. 2193-2199, 2004.

Rodriguez et al., "Long-Lifetime Power inverter for Photovoltaic AC Modules," IEEE Transaction on Industrial Electronics, vol. 55, No. 7, pp. 2593-2601, Jul. 2008.

Ropp et al., "Determining the Relative Effectiveness of Islanding Detection Methods Using Phase Criteria and Nondetection Zones," IEEE Transactions on Energy Conversion, vol. 15, No. 3, pp. 290-296, Sep. 2000.

Russell et al., "SunSine300 AC Module, Annual Report Jul. 25, 1995-Dec. 31, 1996," NREL/SR-520-23432, UC Category 1280, 1997, 31 pages.

Schmidt et al., "Control of an Optimized Converter for Modular Solar Power Generation," 20th International Conference on Industrial Electronics, Control and Instrumentation, vol. 1, pp. 479-484, 1994.

Schutten et al., "Characteristics of Load Resonant Converters Operated in a High-Power Factor Mode," IEEE, Trans. Power Electronics, vol. 7, No. 2, pp. 5-16, 1991.

Sen et al., "A New DC-to-AC Inverter With Dynamic Robust Performance," 1998 IEEE Region 10 International Conference on Global Connectivity in Energy, Computer, Communication and Control, vol. 2, pp. 387-390, 1998.

Shimizu et al., "Flyback-Type Single-Phase Utility Interactive Inverter with Power Pulsation Decoupling on the DC Input for an AC Photovoltaic Module System," IEEE, Trans. Power Electronics, vol. 21, No. 5, pp. 1264-1272, Sep. 2006.

Singh et al., "Comparison of PI, VSC and Energy Balance Controller for Single Phase Active Filter Control," 1998 IEEE Region 10 International Conference on Global Connectivity in Energy, Computer, Communication and Control, vol. 2, pp. 607-614, 1998.

Strong et al., "Development of Standardized, Low-Cost AC PV Systems—Phase I Annual Report," NREL/SR-520-23002, Jun. 1997, 18 pages.

Strong et al., "Development of Standardized, Low-Cost AC PV Systems—Final Technical Report," NREL/SR-520-26084, Feb. 1999, 27 pages.

Sung et al., "Novel Concept of a PV Power Generation System Adding the Function of Shunt Active Filter," 2002 Transmission and Distribution Conference and Exhibition: Asia Pacific, vol. 3, pp. 1658-1663, 2002.

Takahashi et al., "Development of Long Life Three Phase Uninterruptible Power Supply Using Flywheel Energy Storage Unit," Proc. Int'l. Conf. Power Electronics, vol. 1, pp. 559-564, 1996.

Takahashi et al., "Electrolytic Capacitor—Less PWM Inverter", in Proceedings of the IPEC '90 Tokyo, Japan, pp. 131-138, Apr. 2-6, 1990.

Thomas et al., "Design and Performance of Active Power Filters," IEEE IAS Magazine, 9 pages, 1998.

Tian, "Solar-Based Single-Stage High-Efficiency Grid-Connected Inverter," Masters Thesis, University of Central Florida, Orlando, 83 pages, 2005.

Vezzini et al, "Potential for Optimisation of DC-DC Converters for Renewable Energy by use of High Bandgap Diodes," 35th Annual IEEE Power Electronics Specialists Conference, vol. 5, 3836-3842, 2004.

Wada et al., "Reduction Methods of Conducted EMI Noise on Parallel Operation for AC Module Inverters," 2007 IEEE Power Electronics Specialists Conference, pp. 3016-3021, Jun. 2007.

Wu et al., "A Single-Phase Inverter System for PV Power Injection and Active Power Filtering With Nonlinear Inductor Consideration," IEEE Transactions on Industry Applications, vol. 41, No. 4, pp. 1075-1083, 2005.

Wu, et al., "A φ 3W Grid-Connection PV Power Inverter with APF Based on Nonlinear Programming and FZPD Algorithm," Eighteenth Annual IEEE Applied Power Electronics Conference and Exposition, APEC '03, vol. 1, pp. 546-5552, 2003.

Wu, et al., "A 1φ 3W Grid-Connection PV Power Inverter with Partial Active Power Filter," IEEE Transactions on Aerospace and Electronic Systems, vol. 39, No. 2, pp. 635-646, Apr. 2003.

Wu, et al., "PV Power Injection and Active Power Filtering With Amplitude-Clamping and Amplitude-Scaling Algorithms," IEEE Trans. on Industry Applications, vol. 43, No. 3, pp. 731-741, 2007.

Xue et al., "Topologies of Single-Phase Inverters for Small Distributed Power Generators: An Overview," IEEE Transactions on Power Electronics, vol. 19, No. 5, pp. 1305-1314, 2004.

Ando et al., "Development of Single Phase UPS Having AC Chopper and Active Filter Ability," IEEE International Conference on Industrial Technology, 10.1109/ICIT.2006.372445, pp. 1498-1503, 2006.

Biel et al., "Sliding-Mode Control Design of a Boost-Buck Switching Converter for AC Signal Generation," vol. 51, issue 8, pp. 1539-1551, 2004.

Biel et al., "Sliding-Mode Control of a Single-Phase AC/DC/AC Converter," Proceedings of the 40th IEEE Conference on Decision and Control, vol. 1., pp. 903-907, Dec. 2001.

Bose et al., "Electrolytic Capacitor Elimination in Power Electronic System by High Frequency Filter," Conference Record of the 1991 IEEE Industry Applications Society Annual Meeting, vol. 1, pp. 869-878, 1991.

Bower et al., "Innovative PV Micro-inverter Topology Eliminates Electrolytic Capacitors for Longer Lifetime," Conference Record of the 2006 IEEE 4th World Conference on Photovoltaic Energy Conversion, vol. 2, pp. 2038-2041, May 2006.

Bower, "The AC PV Building Block-Ultimate Plug-n-Play That Brings Photovoltaics Directly to the Customer," Proceedings of the National Center for Photovoltaics (NCPV) and Solar Program Review Meeting, pp. 311-314, May 2003.

Brekken et al., "Utility-Connected Power Converter for Maximizing Power Transfer From a Photovoltaic Source While Drawing Ripple-Free Current," 2002 IEEE 33rd Annual Power Electronics Specialists Conference, vol. 3, pp. 1518-1522, 2002.

Brekken, "Utility-Connected Power Converter for Maximizing Power Transfer From a Photovoltaic Source," Thesis Submitted to the Faculty of the Graduate School of the University of Minnesota, Jun. 2002, 56 pages.

Bush, "UK Solar Firm Discloses Novel Inverter Topology," ElectronicsWeekly.com. Apr. 2011, last accessed Aug. 30, 2011 at http://www.electronicsweekly.com/Articles/2011/04/26/50953/UK-solar-firrn-discloses-novel-inverter-topology.htm.

Chang et al., "The Impact of Switching Strategies on Power Quality for Integral Cycle Controllers," IEEE Transactions on Power Delivery, vol. 18, No. 3, pp. 1073-1078, Jul. 2003.

Chisenga, "Development of a Low Power Photovoltaic Inverter for Connection to the Utility Grid," PhD Thesis, Fitzwilliam College, Cambridge, 173 pages, 2007.

Di Napoli et al., "Multiple-Input DC-DC Power Converter for Power-Flow Management in Hybrid Vehicles," Conference Rec. IEEE Industrial Applications Soc. Annual Meeting, pp. 1578-1585, 2002.

Edelmoser, "Improved 2kw Solar Inverter With Wide Input Voltage Range," IEEE 10th Mediterranean Conference, MEIeCon 2000, vol. 2, pp. 810-813, 2000.

Enphase Energy, "Application Note: Multi-Tenant Design Guidelines," rev. 1, 5 pages, 2008.

Enphase Energy, "Enphase Field Wiring Diagram—M190 & M210 Microinverters—240v, Single Phase," Drawing No. 144-00001, rev. 6, 1 page, 2009.

Enphase Energy, "Enphase Micro-Inverter Technical Data," Doc. No. 142-00004, rev. 2, 2 pages, 2008.

Esram et al., "Comparison of Photovoltaic Array Maximum Power Point Tracking Techniques," IEEE Transactions on Energy Conversion, vol. 22, No. 2, pp. 439-449, Jun. 2007.

Henze et al., "A Novel AC Module with High Voltage Panels in CIS Technology," 23rd European Photovoltaic Solar Energy Conference, Valencia, Spain, ISBN 3-936338-24-8, 8 pages, Sep. 2008.

Hu et al., "Efficiency Improvement of Grid-tied Inverters at Low Input Power Using Pulse Skipping Control Strategy," Twenty-Fifth Annual IEEE Applied Power Electronics Conference and Exposition, pp. 627-633, Feb. 2010.

Hung et al., "Analysis and Implementation of a Delay-compensated Deadbeat Current Controller for Solar Inverters," IEEE Proceedings—Circuits, Devices and Systems, pp. 279-286, 2001.

Itoh et al., "Ripple Current Reduction of a Fuel Cell for a Single-Phase isolated Converter using a DC Active Filter with a Center Tap," Twenty-Fourth Annual IEEE Applied Power Electronics Conference and Exposition, APEC '09, pp. 1813-1818, 2009.

Jantsch et al., "AC PV Module Inverters With Full Sine Wave Burst Operation Mode for Improved Efficiency of Grid Connected Systems at Low Irradiance," Proceedings of the 14th European Photovoltaic Solar Energy Conference, 5 pages, 1997.

Jeong et al., "An Improved Method for Anti-Islanding by Reactive Power Control," pp. 965-970, 2005.

Jung et al., "A Feedback Linearizing Control Scheme for a PWM Converter-Inverter Having a Very Small DC-Link Capacitor," IEEE Transactions on Industry Applications, vol. 35., issue 5, pp. 1124-1131, 1999.

Jung et al., "High-frequency DC Link Inverter for Grid-Connected Photovoltaic System," Conference Record of the Twenty-Ninth IEEE Photovoltaic Specialists Conference, pp. 1410-1413, 2002.

Kern, "SunSine300: Manufacture of an AC Photovoltaic Module, Final Report, Phases I & II, Jul. 25, 1995-Jun. 30, 1998," NREL/SR-520-26085, 1999, 32 pages.

Khajehoddin et al., "A Nonlinear Approach to Control Instantaneous Power for Single-phased Grid-connected Photovoltaic Systems," IEEE Energy Conversion Congress and Exposition (ECCE), pp. 2206-2212, 2009.

Khajehoddin et al., "A Novel Topology and Control Strategy for Maximum Power Point Trackers and Multi-string Grid-connected PV Inverters," Applied Power Electronics Conference, APEC08, pp. 173-178, 2008.

Khajehoddin et al.., "A Robust Power Decoupler and Maximum Power Point Tracker Topology for a Grid-Connected Photovoltaic System," IEEE Power Electronics Specialists Conference, PESC08, pp. 66-69, 2008.

Kim et al., "New Control Scheme for AC-DC-AC Converter Without DC Link Electrolytic Capacitor," 24th Annual IEEE Power Electronics Specialists Conference, PESC '93 Record., pp. 300-306, 1993.

Kitano et al., "Power Sensor-less MPPT Control Scheme Utilizing Power Balance at DC Link—System Design to Ensure Stability and Response," The 27th Annual Conference of the IEEE Industrial Electronics Society, vol. 2, pp. 1309-1314, 2001.

Kjaer et al., "A Novel Single-Stage Inverter for the AC-module with Reduced Low-Frequency Ripple Penetration," EPE 2003, ISBN 90-75815-07-7, 10 pages, 2003.

Kjaer et al., "A Review of Single-phase Grid-connected inverters for Photovoltaic Modules," IEEE Trans on Power Electronics, vol. 41, No. 5, pp. 1292-1306, 2005.

Kjaer et al., "Design Optimization of a Single Phase Inverter for Photovoltaic Applications," IEEE 34th Annual Power Electronics Specialist Conference, PESC '03, vol. 3, pp. 1183-1190, 2003.

Kjaer et al., "Power Inverter Topologies for Photovoltaic Modules—A Review," Conf. record of the 37th Industry Applications Conference, vol. 2, pp. 782-788, 2002.

Kjaer, "Design and Control of an Inverter for Photovoltaic Applications," PhD Thesis, Aalborg University Institute of Energy Technology, 236 pages, 2005.

Kjaer, "Selection of Topologies for the PHOTOENERGY™ Project," Aalborg University Institute of Energy Technology, 37 pages, 2002.

Kotsopoulos et al., "A Predictive Control Scheme for DC Voltage and AC Current in Grid-Connected Photovoltaic Inverters with Minimum DC Link Capacitance," The 27th Annual Conference of the IEEE Industrial Electronics Society, vol. 3, pp. 1994-1999, 2001.

Kotsopoulos et al., "Predictive DC Voltage Control of Single-Phase PV Inverters with Small DC Link Capacitance," 2003 IEEE International Symposium on Industrial Electronics, vol. 2, pp. 793-797, 2003.

* cited by examiner

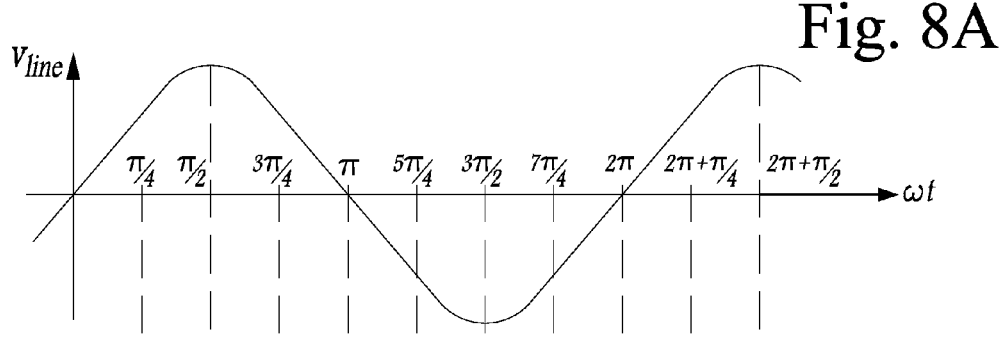
Fig. 8A
Fig. 8B
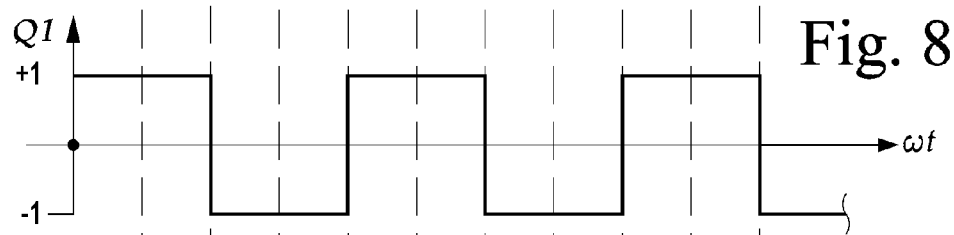
Fig. 8C
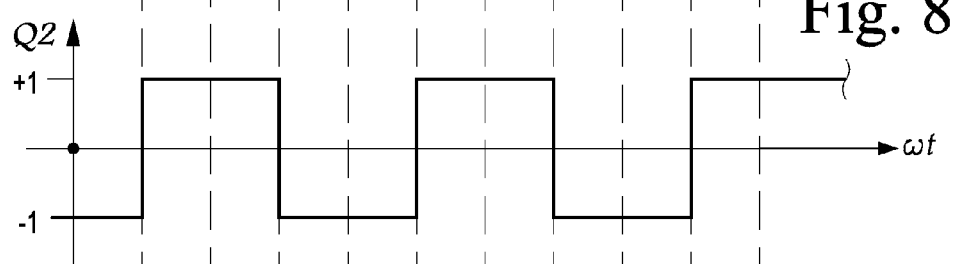
Fig. 8D
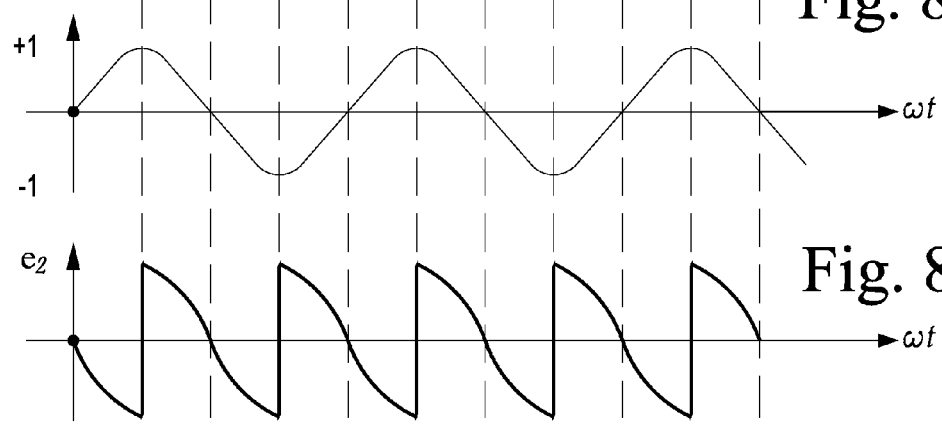
Fig. 8E

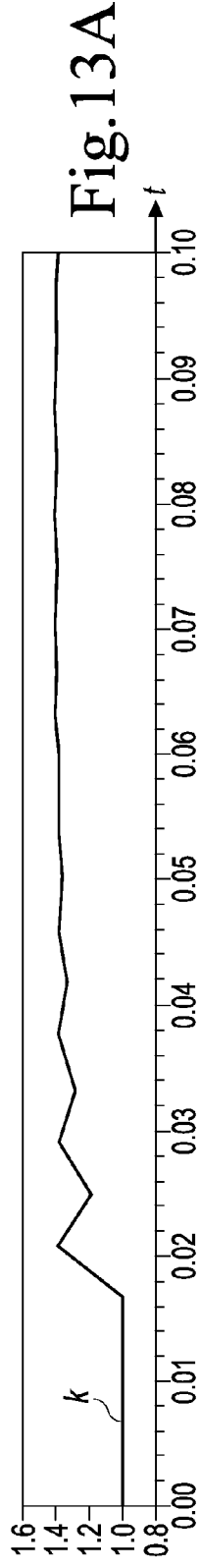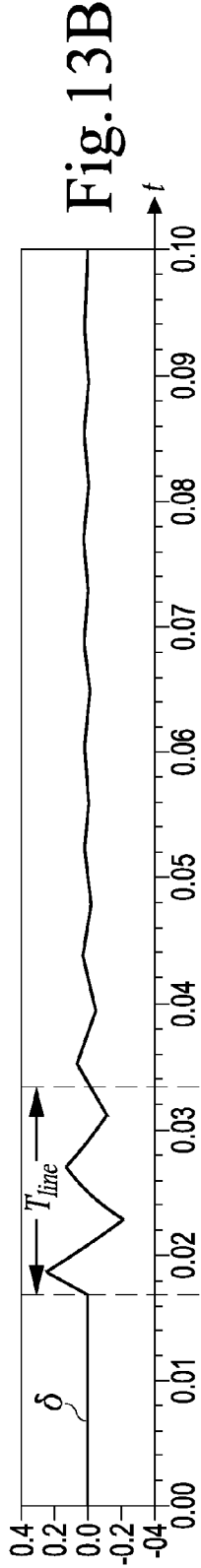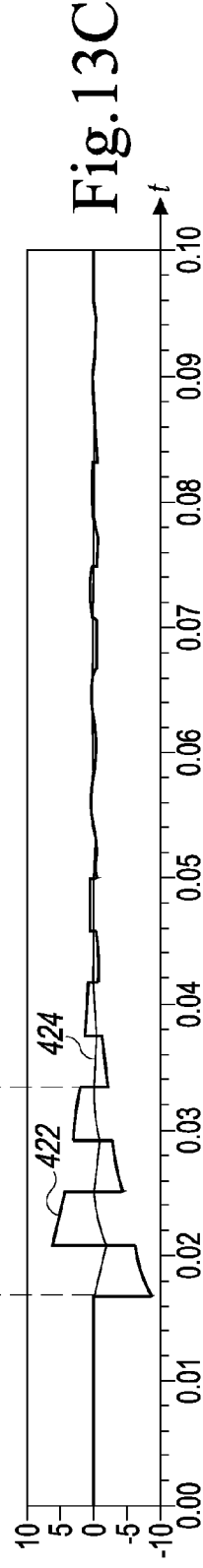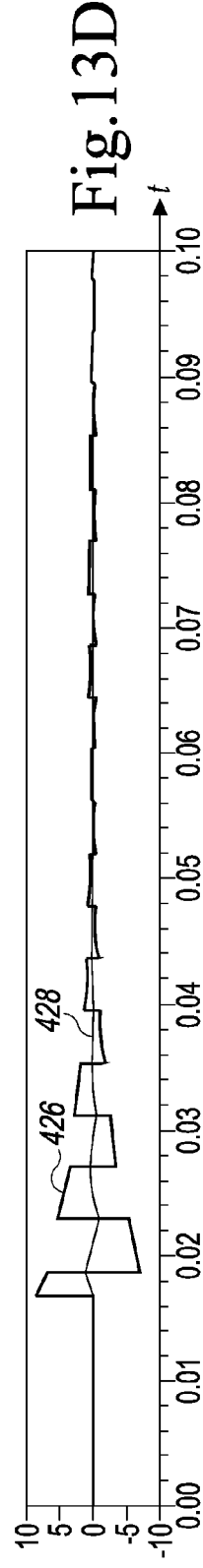

QUADRATURE-CORRECTED FEEDFORWARD CONTROL APPARATUS AND METHOD FOR DC-AC POWER CONVERSION

TECHNICAL FIELD

The present disclosure relates, generally, to methods and apparatuses for controlling power converters that convert DC power to AC power and, more particularly, to methods and apparatuses for controlling DC-to-AC converters configured to deliver power from a photovoltaic source to an AC grid.

BACKGROUND

One application of alternative energy sources is the delivery of power to an alternating-current (AC) utility grid. In such applications, an inverter (i.e., a DC-AC power conditioner) is required in order to convert the DC power delivered by the alternative energy source into sinusoidal alternating-current (AC) power at the grid frequency. Certain inverters (e.g., those used by residential customers or small businesses) convert the DC power delivered by the alternative energy source into single-phase AC power and deliver a sinusoidal current to the AC grid at the grid frequency. One figure of merit for such inverters is the utilization ratio, which is the percentage of available power that the inverter can extract from an energy source. Ideally, an inverter will achieve a utilization ratio of 100%.

A basic electrical property of a single-phase AC power system is that the energy flow includes both an average power portion that delivers useful energy from the energy source to the load and a double-frequency portion that flows back and forth between the load and the source:

$$p(t) = Po + Po^* \cos(2\omega t + \phi)$$

In applications involving inverters, the double-frequency portion ($Po^* \cos(2\omega t + \phi)$) represents undesirable ripple power that, if reflected back into the DC power source, may compromise performance of the source. Such concern is particularly worrisome for photovoltaic cells.

Photovoltaic cells have a single operating point at which the values of the current and voltage of the cell result in a maximum power output. This "maximum power point" ("MPP") is a function of environmental variables, including light intensity and temperature. Inverters for photovoltaic systems typically comprise some form of maximum power point tracking ("MPPT") as a means of finding and tracking the maximum power point ("MPP") and adjusting the inverter to exploit the full power capacity of the cell at the MPP. Extracting maximum power from a photovoltaic cell typically requires that the cell operate continuously at its MPP; fluctuations in power demand, caused, for example, by double-frequency ripple power being reflected back into the cell, will compromise the ability of the inverter to deliver the cell's maximum power. Thus, to maximize the utilization ratio, an inverter for photovoltaic energy systems should draw only the average power portion of the energy flow from the photovoltaic cells at the inverter input. Such inverters should therefore comprise means to manage the double-frequency ripple power without reflecting the ripple power back into the source.

To manage double-frequency ripple power, energy needs to be stored and delivered at twice the AC frequency. One way to manage the double-frequency ripple power is to use passive filtering in the form of capacitance across a DC bus of the inverter. However, passive filtering alone may require a relatively large capacitance value to filter the double-frequency power, since the double-frequency energy exchange needs to be supported by the capacitor without imposing significant voltage ripple on the DC bus. Controlling the duty cycle of a regulator that is connected between the source and the DC bus may enable further attenuation, over and above that provided by the bus capacitor alone, in the amount of the double-frequency ripple power that is reflected back into the source.

Another way to manage double-frequency ripple power is to use an active filter circuit that supplies the double-frequency ripple power by means of a capacitor internal to the active filter. Whereas the passive filtering approach requires a relatively large filter capacitor, the internal capacitor in an active filter may be made relatively smaller, since it is only required to store and deliver the double-frequency ripple power and is not required to support the DC bus voltage. Because the active filter "isolates" the internal capacitor from the DC bus, the voltage variation across the internal capacitor can be relatively large and the value of the capacitor may be made relatively small.

SUMMARY

According to one aspect, an apparatus for controlling the delivery of power from a unipolar input source to an alternating-current (AC) grid, the AC grid characterized by a grid voltage, $V_{rms}$, a nominal grid frequency $\omega$, and a grid phase $\theta$, may include an inverter and an inverter controller. The inverter may include (i) an input converter configured to deliver power from the unipolar input source to a unipolar bus, (ii) an energy storage element coupled to the unipolar bus and configured to supply energy to and absorb energy from the unipolar bus, and (iii) an output converter coupled to the unipolar bus and configured to deliver power from the unipolar bus to the AC grid in the form of a substantially sinusoidal current at the grid frequency. The inverter controller may be coupled to the inverter and may include (i) an output converter controller coupled to the output converter and configured to control the output converter to deliver power to the AC grid and (ii) an input converter controller coupled to the input converter and configured to control a duty cycle of the input converter to control delivery of a pre-determined amount of power from the input source to the unipolar bus.

In some embodiments, the input converter controller may include (i) means for setting a magnitude of the pre-determined amount of power, (ii) a feedforward controller configured to perform a calculation to determine a value for the duty cycle for the input converter such that: (1) the input converter delivers the pre-determined amount of power and (2) the magnitude of a ripple signal reflected into the input source is attenuated toward zero, and (iii) a quadrature corrector configured to determine the effectiveness of the calculation in attenuating the ripple and to adaptively alter the calculation to improve the effectiveness of the calculation.

Additionally, in some embodiments, the input source may be embodied as a photovoltaic ("PV") cell and the means for setting a magnitude may be embodied as a Maximum Power Point Tracking controller. In some embodiments, the energy storage element is a capacitor. Additionally, the ripple signal may include a ripple component at a harmonic of the AC grid frequency and/or a second harmonic of the AC grid frequency.

In some embodiments, the feedforward controller may be configured to receive a signal, $d_0$, from the means for setting a magnitude. The signal $d_0$ may be indicative of the duty cycle that is required to deliver the pre-determined amount of power. In such embodiments, the quadrature corrector may be configured to deliver a phase correction term, δ, and a gain correction term, k, to the feedforward controller. Additionally, the feedforward controller calculates a duty cycle, d, of the form: $d=d_0-k \cdot C$.

Additionally, in some embodiments, the energy storage element is embodied as a storage capacitor of value $C_{bus}$. In such embodiments, the feedforward controller may be configured to receive (i) measurements indicative of the value of the rms value of the AC grid voltage, $V_{rms}$, (ii) the rms value of the substantially sinusoidal current delivered by the output converter, $I_{rms}$, and (iii) the value of the unipolar bus voltage, $V_{bus0}$; and to set $$C = (1-d_0)\frac{V_{rms}I_{rms}}{2\omega V_{bus0}^2 C_{bus}}\sin(2\omega t).$$

In some embodiments, the feedforward controller may be configured to receive (i) a measurement indicative of the value of the power delivered by the inverter to the AC grid, $P_{out}$, and (ii) a value φ indicative of a phase difference between the phase of the current delivered to the AC grid and the phase of the AC grid voltage; and to set $$C = (1-d_0)\frac{P_{out}}{2\omega V_{bus0}^2 C_{bus}\cos(\phi)}\sin(2\omega t).$$

In some embodiments, the feedforward controller is configured to receive (i) a measurement indicative of the power delivered by the unipolar input source, $P_s$; (ii) a value φ indicative of a phase difference between the phase of the current delivered to the AC grid and the phase of the AC grid voltage; and (iii) a value η indicative of the operating efficiency of the inverter; and to set $$C = (1-d_0)\frac{P_s}{2\omega V_{bus0}^2 C_{bus}\cos(\phi)}\sin(2\omega t).$$

Additionally, in some embodiments, the feedforward controller may be configured to receive (i) measurements indicative of the value of the voltage delivered by the unipolar input source, $V_s$, (ii) measurements indicative of the value of the current delivered by the unipolar input source, $I_s$, (iii) a value φ indicative of a phase difference between the phase of the current delivered to the AC grid and the phase of the AC grid voltage, and (iv) a value η indicative of the operating efficiency of the inverter; and to set $$C = (1-d_0)\frac{V_s I_s}{2\omega V_{bus0}^2 C_{bus}\cos(\phi)}\sin(2\omega t).$$

In some embodiments, the quadrature corrector may include a first low pass filter that is configured to receive a measurement indicative of the magnitude of an input current delivered by the unipolar input source, $i_{in}$, and to deliver a double-frequency signal, $\tilde{i}_{in}$, indicative of the magnitude of the component of the input current ripple that is twice the frequency of the AC grid frequency. Additionally, in some embodiments, the quadrature corrector may further include a phase error detector configured to generate a phase error signal based upon a difference between the phase of the double-frequency signal and the grid phase, θ. In such embodiments, the phase error signal may have a zero average value when said difference is substantially zero.

Additionally, in some embodiments, the phase error detector may include a first phase comparator that receives a signal indicative of the grid phase, θ, and delivers a signal, $Q_2$, such that $$Q_2 = \begin{cases} 1 & \text{if } \frac{\pi}{4} < \text{mod}(\theta, \pi) < \frac{3\pi}{4} \\ -1 & \text{otherwise} \end{cases}.$$

The phase error detector may also include a first multiplier that delivers a phase error signal, $e_2 = Q_2 \cdot \tilde{i}_{in}$, a second low pass filter configured to deliver a signal $\overline{e_2}$ indicative of the average value of $e_2$, and a first proportional-integral filter configured to receive $\overline{e_2}$ and deliver the phase correction term, δ.

In some embodiments, the quadrature corrector may further include a gain error detector that generates a gain error signal based upon the magnitude of the double-frequency signal. In such embodiments, the gain error signal may have a zero average value when said magnitude is substantially zero. Additionally, in some embodiments, the gain error detector may include a second phase comparator that receives a signal indicative of the phase of the AC grid and delivers a signal:

$$Q_1 = \begin{cases} 1 & \text{if } 0 < \text{mod}(\theta, \pi) < \frac{\pi}{2} \\ -1 & \text{otherwise} \end{cases}.$$

The gain error detector may also include a second multiplier that delivers a gain error signal, $e_1 = Q_1 \cdot \tilde{i}_{in}$, a third low pass filter configured to deliver a signal $\overline{e_1}$ indicative of the average value of $e_1$, and a second proportional-integral filter configured to receive $\overline{e_1}$ and deliver the gain correction term k.

Additionally, in some embodiments the input converter may be embodied as a current-controlled converter. In some embodiments, the input converter is embodied as a boost switching power converter. Further, in some embodiments, the boost switching power converter may include an isolation transformer for providing galvanic isolation between the input source and the unipolar bus. Additionally, in some embodiments, the output converter controller is configured to control the output converter to deliver power to the AC grid in the form of a substantially sinusoidal current at the grid frequency. Additionally, in some embodiments, the inverter may further include an output filter connected between the output converter and the AC grid.

In some embodiments, the average power delivered to the AC grid by the output converter is controlled by the output converter controller to be substantially equal to the power delivered by the unipolar source less the substantial total of the power losses in the inverter. Additionally, in some embodiments, the power delivered to the grid may be controlled by the output controller to comprise an average power component and a time-varying power component. Further, in some embodiments, the output converter may be embodied as a full-bridge switching circuit comprising controllable switches configured to receive power from the unipolar bus and deliver power to the AC grid.

In some embodiments, the output converter controller may include a feedforward controller configured to receive a measurement of the power delivered to the input converter by the unipolar input source, $P_S$, a measurement of the rms grid voltage, $V_{rms}$, a measurement of the grid phase, $\theta$, a pre-determined setpoint value of a power factor angle, $\phi$. In such embodiments, the feedforward controller may be configured to control the output converter to deliver to the AC grid a time-varying component of current essentially equal to:

$$i_{LFF}(t) = (\sqrt{2}V_{rms}) \cdot (\cos(\theta+\phi)/\cos(\phi)).$$

Additionally, in such embodiments, the energy storage element may be embodied as a capacitor, $C_{bus}$, and the output converter controller may include a feedback controller that receives (i) a measurement of the average voltage across the unipolar bus, $V_{bus0}$, and (ii) a pre-determined setpoint value indicative of a desired average value of the unipolar bus voltage, $V_{bus}^*$. In such embodiments, the feedback controller may control the output converter to deliver to the AC grid an additional time-varying component of current, which, when combined with $i_{LFF}(t)$, causes $V_{bus0}$ to be substantially equal to $V_{bus}^*$. Additionally, in such embodiments, the output converter controller may be configured to alter the magnitude of $V_{bus}^*$ as a function of selected inverter operating conditions. Further, the selected inverter operating conditions comprise the operating power of the converter and the AC grid voltage. Additionally, in some embodiments, the output converter controller may include a filter that receives a measurement of the voltage across the unipolar bus, $V_{bus}$, and delivers the measurement of the average voltage across the unipolar bus, $V_{bus0}$. Additionally, the filter may include a low-frequency rolloff filter having a pole at a frequency equal to one-tenth of the grid frequency.

According to another aspect, a method for controlling an inverter that is configured to deliver power from a unipolar input source to an alternating-current ("AC") grid at a grid voltage and grid phase, may include delivering a pre-determined amount of power from the unipolar input source to a unipolar bus using an input converter, supplying energy to and absorbing energy from the unipolar bus using an energy storage capacitor, delivering power from the unipolar bus to the AC grid using an output converter, and controlling the operation of the inverter using an inverter controller. In some embodiments, controlling the operation of the inverter may include (i) calculating a duty cycle for the input converter such that (a) the input converter delivers the pre-determined amount of power and (b) the magnitude of a ripple signal reflected into the input source may be attenuated toward zero, and (ii) determining the effectiveness of the calculation in attenuating the ripple and adaptively altering the calculation to improve the effectiveness of the calculation.

Additionally, in some embodiments, delivering the predetermined amount of power may include delivering the predetermined amount of power from the unipolar input source to the unipolar bus using an input converter comprising a switching power converter, and controlling the operation of the input converter may include controlling the input converter using an input converter controller of the inverter controller. Further, in some embodiments, delivering power from the unipolar bus to the AC grid may include delivering power from the unipolar bus to the AC grid using an output converter comprising a switching power converter, and controlling the operation of the output converter may include controlling the output converter using an output converter controller of the inverter controller to deliver power to the AC grid.

In some embodiments, the energy storage element may be embodied as a bus capacitor and the input converter may be embodied as a switching power converter. In such embodiments, controlling the input converter may include (i) providing to the inverter controller: a value indicative of the size of the bus capacitor, $C_{bus}$, a value indicative of the grid frequency, $\omega$, a measurement of the rms grid voltage, $V_{rms}$, a measurement of the rms inverter output current, $I_{rms}$, a measurement of the unipolar bus voltage, $V_{bus0}$, a measurement of the grid phase, $\theta$; (ii) calculating a duty cycle for the input converter by: adjusting a nominal duty cycle, $d_0$, to a value that is consistent with delivering the pre-determined amount of power, calculating a correction term, $\tilde{d}$, for attenuating a reflected ripple signal, $\tilde{i}_r$, at a frequency $2\omega$:

$$\tilde{d} = k(1-d_0)\frac{V_{rms}I_{rms}}{2\omega V_{bus0}^2 C_{bus}}\sin(2\omega t + \delta),$$

and
setting the input converter duty cycle equal to: $d=\tilde{d}+d_0$; and (iii) assessing the effectiveness of the calculation of the correction term in attenuating the said reflected ripple signal and adaptively altering the values of k and $\delta$ to improve the effectiveness.

Additionally, in some embodiments, controlling the input converter may include (i) providing to the inverter controller: a value indicative of the size of the bus capacitor, $C_{bus}$, a value $\omega$ indicative of the grid frequency, a value $\phi$ indicative of a phase difference between the phase of the current delivered to the AC grid and the phase of the AC grid voltage, a measurement of the inverter output power, $P_{out}$, a measurement of the unipolar bus voltage, $V_{bus0}$, a measurement of the grid phase, $\theta$; (ii) calculating a duty cycle for the input converter by: adjusting a nominal duty cycle, $d_0$, to a value that is consistent with delivering the pre-determined amount of power, calculating a correction term, $\tilde{d}$, for attenuating a reflected ripple signal, $\tilde{i}_r$, at a frequency $2\omega$:

$$\tilde{d} = k(1-d_0)\frac{P_{out}}{2\omega V_{bus0}^2 C_{bus}\cos(\phi)}\sin(2\omega t + \delta),$$

and
setting the input converter duty cycle equal to: $d=\tilde{d}+d_0$; and (iii) assessing the effectiveness of the calculation of the correction term in attenuating the said reflected ripple signal and adaptively altering the values of k and $\delta$ to improve the effectiveness.

Additionally, in some embodiments, controlling the input converter may include (i) providing to the inverter controller: a value $C_{bus}$ indicative of the size of the bus capacitor, a value $\omega$ indicative of the grid frequency, a value $\eta$ indicative of the operating efficiency of the inverter, a value $\phi$ indicative of a phase difference between the phase of the current delivered to the AC grid and the phase of the AC grid voltage, a measurement $P_s$ of the power delivered by the unipolar input source, a measurement $V_{bus0}$ of the unipolar bus voltage, a measurement $\theta$ of the grid phase; (ii) calculating a duty cycle for the input converter by: adjusting a nominal duty cycle, $d_0$, to a value that is consistent with delivering the pre-determined amount of power, calculating a correction term, $\tilde{d}$, for attenuating a reflected ripple signal, $\tilde{i}_r$, at a frequency $2\omega$:

$$\tilde{d} = k(1-d_0)\frac{P_s}{2\omega V_{bus0}^2 C_{bus}\cos(\phi)}\sin(2\omega t + \delta),$$

and
setting the input converter duty cycle equal to: $d=\tilde{d}+d_0$; and (iii) assessing the effectiveness of the calculation of the correction term in attenuating the said reflected ripple signal and adaptively altering the values of k and $\delta$ to improve the effectiveness.

Additionally, in some embodiments, controlling the input converter may include (i) providing to the inverter controller: a value $C_{bus}$ indicative of the size of the bus capacitor, a value ω indicative of the grid frequency, a value η indicative of the operating efficiency of the inverter, a value φ indicative of a phase difference between the phase of the current delivered to the AC grid and the phase of the AC grid voltage, a measurement of the voltage delivered by the unipolar input source, $V_s$, a measurement of current delivered by the unipolar input source, $I_s$, a measurement $V_{bus0}$ of the unipolar bus voltage, a measurement of the grid phase, θ; (ii) calculating a duty cycle for the input converter by: adjusting a nominal duty cycle, $d_0$, to a value that is consistent with delivering the pre-determined amount of power; calculating a correction term, $\tilde{d}$, for attenuating a reflected ripple signal, $\tilde{i}_r$, at a frequency 2ω:

$$\tilde{d} = k(1-d_0)\frac{V_s I_s}{2\omega V_{bus0}^2 C_{bus}\cos(\phi)}\sin(2\omega t + \delta),$$

and
setting the input converter duty cycle equal to: $d=\tilde{d}+d_0$; and (iii) assessing the effectiveness of the calculation of the correction term in attenuating the said reflected ripple signal and adaptively altering the values of k and δ to improve the effectiveness.

Additionally, in some embodiments, assessing the effectiveness may include generating a signal, $Q_1$:

$$Q_1 = \begin{cases} 1 & \text{if } 0 < \text{mod}(\theta, \pi) < \frac{\pi}{2} \\ -1 & \text{otherwise;} \end{cases}$$

then multiplying $Q_1$ and the reflected ripple signal to generate an error signal, $e_1=Q_1\cdot\tilde{i}_{in}$; and controlling the value of k to reduce the average value of $e_1$ towards zero.

Yet further, in some embodiments, assessing the effectiveness may include generating a signal, $Q_2$:

$$Q_2 = \begin{cases} 1 & \text{if } \frac{\pi}{4} < \text{mod}(\theta, \pi) < \frac{3\pi}{4} \\ -1 & \text{otherwise} \end{cases};$$

then multiplying $Q_2$ and the reflected ripple signal to generate an error signal, $e_2=Q_2\cdot\tilde{i}_r$; and controlling the value of δ to reduce the average value of $e_2$ towards zero.

DESCRIPTION OF THE DRAWINGS

FIGS. 8A through 8E are simulated waveforms for the controller of FIG. 7;

FIGS. 13A through 13D are simulated waveforms for the inverter of FIGS. 9 through 12.

DETAILED DESCRIPTION

Figure 1:
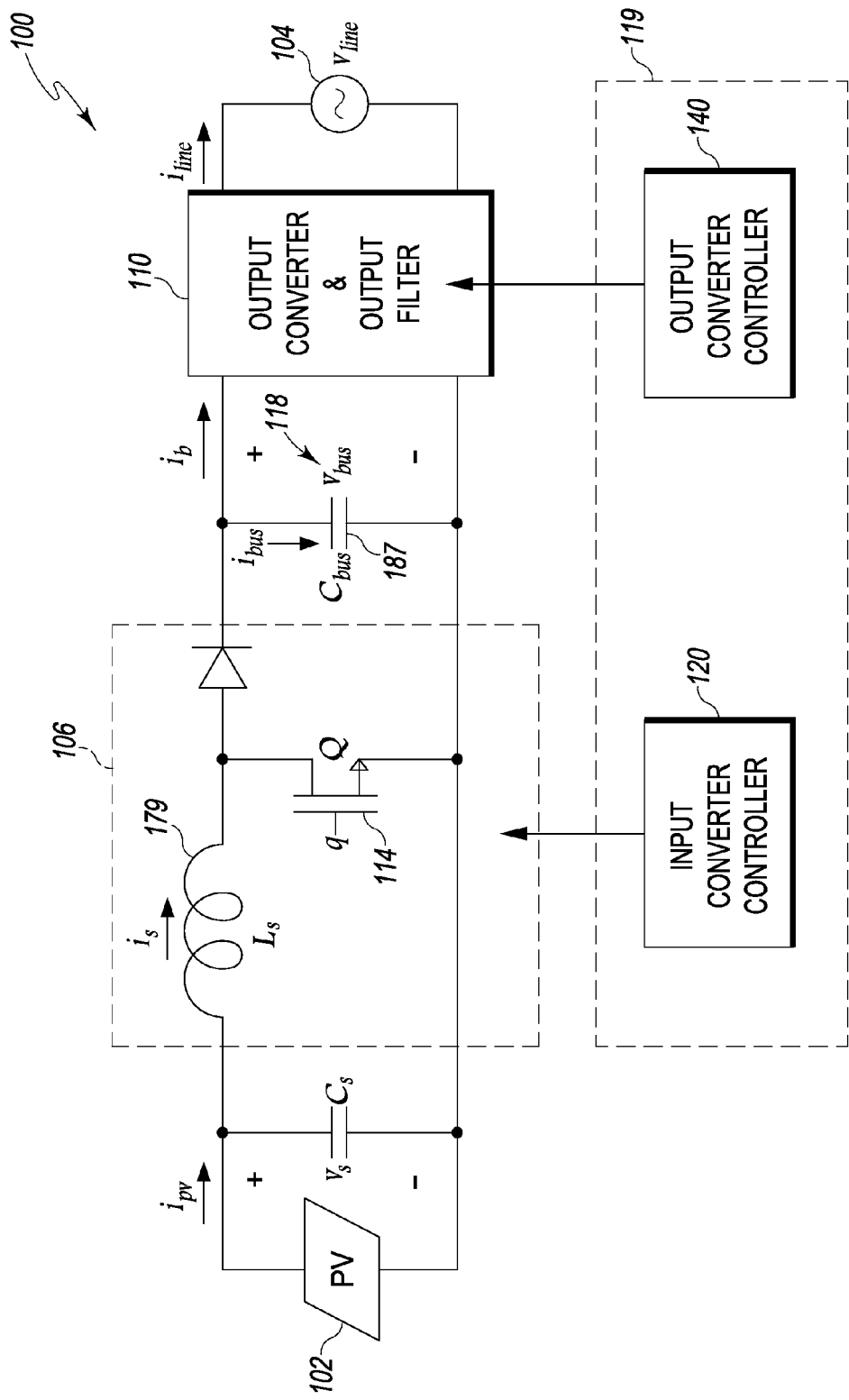
FIG. 1 is a block diagram of one embodiment of an DC-to-AC inverter.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the disclosure that follows, use of the same symbols for both actual and measured signals is for ease of discussion. The measured signals may be measured, converted between the analog and digital domains and vice versa, scaled, level-shifted, filtered, or isolated by known means as needed and it may also be assumed that power or other composite signals may be calculated from voltage and current signals. Furthermore, the fundamental and/or RMS value of the line voltage, $V_{line}$, as well as its phase angle, θ, may be determined by known means.

A simplified system topology for a DC-AC inverter 100 is shown in FIG. 1. The inverter 100 is configured to control the delivery of power from a unipolar input source 102 (e.g., a DC source, a photovoltaic solar cell or module, a fuel cell, or other unipolar input source) to an alternating-current ("AC") grid 104 and, in some embodiments, loads coupled to the AC grid 104. In the discussion that follows, the unipolar input source 102 is assumed to be a photovoltaic cell (PV cell) as illustrated in FIG. 1. However, as discussed above, the unipolar input source 102 may be embodied as other unipolar input sources in other embodiments.

The AC grid 104 may be embodied as a utility power grid that supplies utility AC power to residential and industrial users. Such a grid is characterized by a substantially sinusoidal bipolar voltage (e.g., voltage $V_{line}$ shown in FIG. 1, which may be 240VAC rms); a substantially constant grid frequency, f (e.g., f=ω/2π=50 Hz or 60 Hz); and a grid phase, θ, that is a function of the time integral of the grid frequency, ω (i.e., $\theta=\theta_0+\int\omega dt$), where $\theta_0$ is a constant and ω may vary with time). For clarity of the disclosure, the discussion that follows assumes a constant AC grid frequency (e.g. f=ω/2π=50 Hz or 60 Hz) and the phase of sinusoids is expressed as θ=(2πf)(t)=ωt. However, it should be appreciated that in practice there may be variations in AC grid frequency and a practical inverter may use known means to extract and use the actual time-varying AC grid phase: $\theta=\theta_0+\int\omega dt$, as previously described.

The illustrative inverter 100 of FIG. 1 includes a current-fed input converter 106, output converter 110, and an inverter controller 119. The input converter 106 is configured to boost the relatively low PV cell voltage (e.g., 25V), $V_s$, to a unipolar bus 118 voltage, $V_{bus}$, where the DC value of $V_{bus}$ is sufficiently high (e.g. 400V) to supply energy (via the output converter 110) to the AC grid 104 at the AC grid voltage, $V_{line}$ (e.g., 240V, rms). Although the input converter 106 illustrated in FIG. 1 is a non-isolated boost switching power converter, it should be appreciated that an isolated boost switching power converter may be used in other embodiments (see, e.g., the isolated boost switching power converter 162 illustrated in FIG. 9).

The inverter controller 119 includes an input converter controller 120 and an output converter controller 140. The input converter controller 120 controls one or more switch(es) 114 of the input converter 106 to operate the PV cell at its maximum power point ("MPP"). A bus capacitor $C_{bus}$ 187, is positioned across the voltage bus 118 and provides energy storage. Ideally, all of the double-frequency power that is delivered to the AC grid 104 is supplied by the bus capacitor 187. The output converter controller 140 operates the output converter 110 to deliver the energy supplied by the input converter 106 to the AC grid 104 as a substantially sinusoidal current, $I_{line}$, at the grid frequency.

Figure 2:
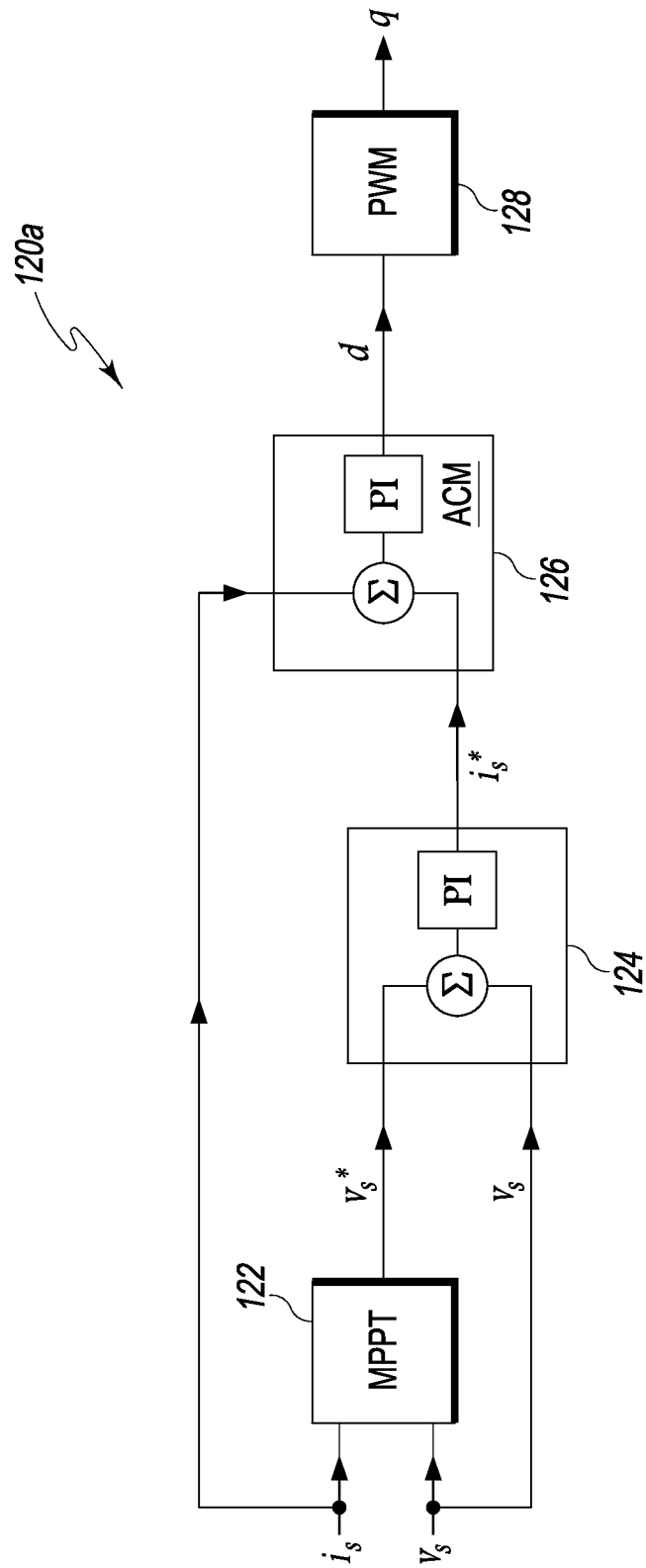
FIG. 2 is a block diagram of one embodiment of an input current controller for the inverters of FIGS. 1 and 9.

Referring now to FIG. 2, in one embodiment, the input converter controller 120 may be embodied as an input converter controller 120a. The input converter controller 120a includes a maximum power point tracking (MPPT) controller 122, a feedback controller 124 (e.g., a proportional-integral (PI) controller), an average current mode (ACM) feedback control block 126, and a PWM control block 128. In one particular embodiment, the MPPT controller 122 and the PI controller 124 are implemented in firmware; and the ACM control block 126 and the PWM control block 128 are implemented in hardware. However, in other embodiments, each of the MPPT controller 122, the PI controller 124, the ACM control block 126, and the PWM control block 128 may be implemented in firmware and/or hardware.

In use, the MPPT controller 122 is configured to establish a maximum power point, $P_{mpp}$, for the PV cell 102 and calculates and delivers an input voltage command $V_s^*$, indicative of the value of the PV cell 102 voltage, $V_s$, at the cell's MPP. It should be appreciated that the MPPT controller 122 may use any one of a number of different MPPT algorithms to establish the maximum power point (see, e.g., U.S. Pat. No. 7,681,090, issued Mar. 16, 2010 and entitled "Ripple Correlation Control Based on Limited Sampling" by Jonathan W. Kimball et al.).

The PI feedback controller 124 is configured to compare the voltage command, $V_s^*$, received from the MPPT controller 122 to the actual value of the PV cell 102 voltage, $V_s$, and generate a converter input current setpoint, $i_s^*$ based thereon. The ACM control block 126 receives the input current command $i_s^*$ from the PI feedback controller 124 and is configured to generate and deliver a duty cycle command, d, to the PWM switch controller 128. The PWM switch controller 128 is configured to control the duty cycle of the input converter switch(es) 114 (see FIG. 1) based on the duty cycle command, d, so that the input converter input current, $i_s$, is controlled to be substantially equal to the value indicated by the command value $i_s^*$.

Figure 3:
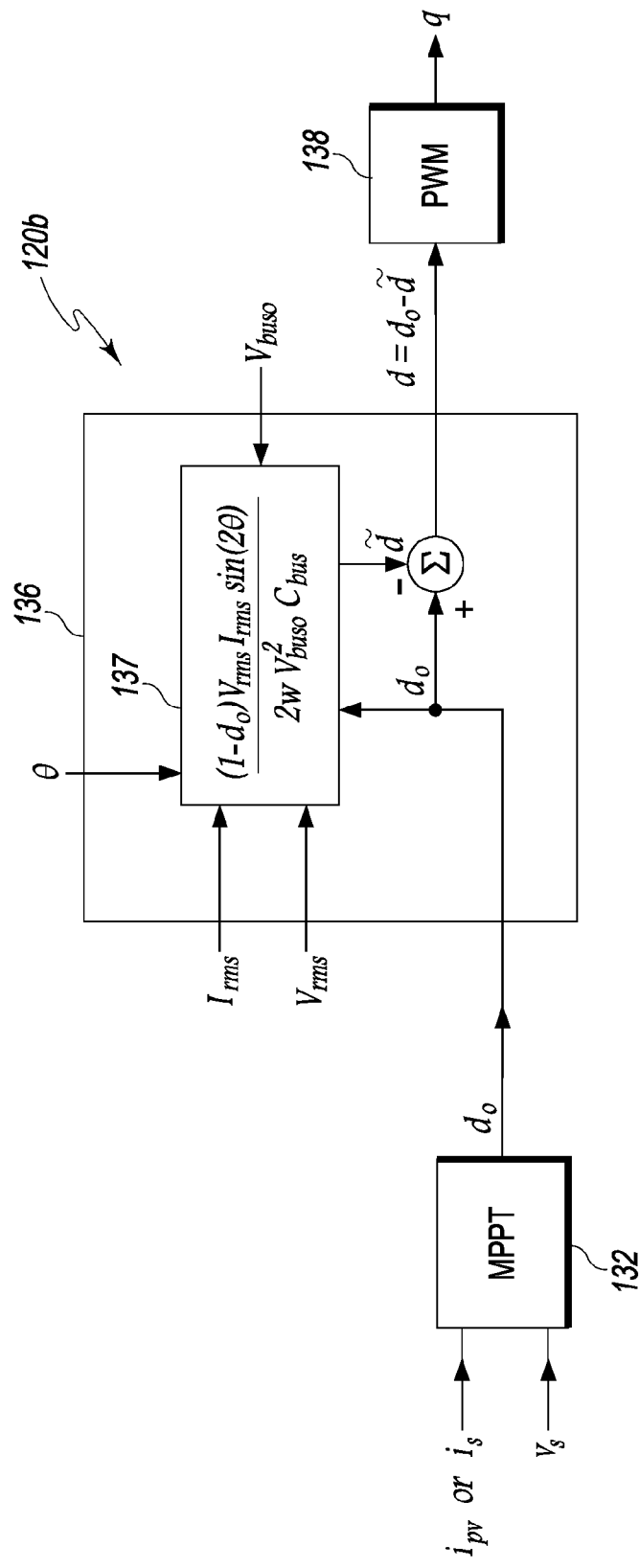
FIG. 3 is a block diagram of another embodiment of an input current controller for the inverters of FIGS. 1 and 9.

Referring now to FIG. 3, in another embodiment, the input converter controller 120 may be embodied as an input converter controller 120b. The input converter controller 120b includes a maximum power point tracking (MPPT) controller 132; a feedforward active filter (FFAF) block 136; and a PWM control block 138. In the illustrative controller 120b of FIG. 3, the MPPT controller 132 is configured to measure the PV cell 102 voltage, $V_s$, and converter input current, $i_s$, (or PV cell current, $i_{pv}$, as discussed below). The MPPT controller 132 generates (using any of many known MPP algorithms as discussed above) a nominal duty cycle, $d_0$, at which the input converter 106 may withdraw maximum power from the PV cell 102. The FFAF block 136 receives the duty cycle, $d_0$, from the MPPT controller 132. Additionally, the FFAF block 136 receives a current signal, $I_{rms}$, indicative of the root-mean-square (rms) value of the inverter AC output current, $I_{line}$; a voltage signal, $V_{rms}$, indicative of the root-mean-square (rms) value of the AC grid voltage, $V_{line}$; a voltage signal, $V_{bus0}$, indicative of the average value of the unipolar bus voltage, $V_{bus}$; and a phase signal, $\theta=wt=(2\pi d)(t)$, indicative of the phase of the AC grid. Using these input signals, a computation block 137 of the FFAF block 136 is configured to calculate a time-varying correction term, $\tilde{d}$, that is added to the nominal duty cycle, $d_0$, to generate the input converter duty cycle signal, $d=\tilde{d}+d_0$. The FFAF block 136 delivers the input converter duty cycle signal, d, to the PWM controller 138, which operates the input converter switch(es) 114 of the inverter 100 at the indicated duty cycle, d. As discussed in more detail below, the correction term, $\tilde{d}$, may enable substantially all of the double-frequency ripple to be filtered out of $V_s$.

The formula used in the calculation block 137 to calculate the correction term, $\tilde{d}$, may be derived from the average value model of the system shown in the FIG. 1. For example, using the input inductor current, $i_s$, and the bus capacitor voltage, $V_{bus}$, as state variables, the average value model can be expressed as follows:

$$L_s \frac{di_s}{dt} = V_s - (1-d)V_{bus} \quad (1)$$

$$C_{bus} = \frac{dV_{bus}}{dt} = (1-d)i_s - i_b \quad (2)$$

where, with reference to FIG. 1, d is the duty cycle of the switch 114; $L_s$ is the value of the input inductor 179; $C_{bus}$ is the value of the bus capacitor 187; $i_b$ is the magnitude of the current flowing into the output converter and filter 110; and $V_{bus}$, $V_s$, and $i_s$ are, respectively, the unipolar bus 118 voltage, PV cell 102 voltage and input converter 106 input current, as shown in FIG. 1 and described above.

Representing each of the variables of equations (1) and (2) as a constant value (represented by variables that include a zero in their subscript) plus a time-varying double-frequency disturbance (represented by variables accented above with a tilde) provides:

$$i_s = i_{s0} + \tilde{i}_s \quad (3)$$

$$V_s = v_{s0} + \tilde{V}_s \quad (4)$$

$$V_{bus} = V_{bus0} + \tilde{V}_s \quad (5)$$

$$i_b = I_{b0} + \tilde{i}_b \quad (6)$$

$$d = \tilde{d} + d_0 \quad (7)$$

and using small-signal analysis and linearization:

$$L_s = \frac{d\tilde{i}_s}{dt} = \tilde{V}_s - (1-d)\tilde{V}_{bus} + \tilde{d}V_{bus0} \quad (8)$$

Elimination of double-frequency ripple in $i_s$ requires that:

$$\tilde{i}_s = 0. \quad (9)$$

Consequently:

$$\tilde{V}_s = 0. \quad (10)$$

Substituting (9) and (10) into (8) and solving for $\tilde{d}$ lead to:

$$\tilde{d} = (1-d_0)\frac{\tilde{V}_{bus}}{V_{bus0}}. \quad (11)$$

Ideally, it is desired that the bus capacitor 187, $C_{bus}$, stores all the double-frequency energy. To do so:

$$C_{bus}\frac{d\tilde{V}_{bus}}{dt} = -\tilde{i}_b. \quad (12)$$

The inverter output power $P_{out}$ is given as:

$$P_{out} = V_{rms}I_{rms}[1+\cos(2\omega t)], \quad (13)$$

Where:

$$\omega = 2\pi f \text{ and } f = AC \text{ grid frequency.} \quad (14)$$

Assuming that the output converter and filter 110 is 100% efficient, $$i_b = \frac{P_{out}}{V_{bus0}} = \frac{V_{rms}I_{rms}}{V_{bus0}[1+\cos(2\omega t)]}. \quad (15)$$

Therefore:

$$\tilde{i}_b = \frac{V_{rms}I_{rms}}{V_{bus0}}\cos(2\omega t). \quad (16)$$

Using (12) and (16):

$$\tilde{V}_{bus} = -\frac{V_{rms}I_{rms}}{2\omega V_{bus0}C_{bus}}\sin(2\omega t). \quad (17)$$

Combining (11) and (17) results in:

$$\tilde{d} = -(1-d_0)\frac{V_{rms}I_{rms}}{2\omega V_{bus0}^2 C_{bus}}\sin(2\omega t). \quad (18)$$

Thus, the double frequency rippled reflected back to $V_s$ (i.e., the unipolar input source 102) may be filtered out by commanding the duty ratio d to be:

$$d = d_0 - (1-d_0)\frac{V_{rms}I_{rms}}{2\omega V_{bus0}^2 C_{bus}}\sin(2\omega t) \quad (19)$$

where $d_0$ is provided by the MPPT controller 134 of FIG. 3 and the correction term $\tilde{d}$ is computed by the computation block 137 in FFAF block 136 using the formulation shown in Equation 18.

Power balances in the inverter require that the power delivered to the AC grid equal the power delivered by the PV cell, less any circuit losses: hence, $P_{out} = \eta V_s I_s = \eta P_s$, where $P_{out}$ is the power delivered by the inverter to the AC grid 104; $V_s$ and $I_s$ are, respectively, the PV cell 102 voltage and current; $\eta$ is the inverter operating efficiency; and $P_s$ is the power delivered by the PV cell 102. In the general case, $P_{out} = V_{rms}I_{rms}\cos(\phi)$ and thus:

$$V_{rms}I_{rms} = \frac{P_{out}}{\cos(\phi)} = \frac{P_s}{\cos(\phi)} = \frac{V_s I_s}{\cos(\phi)}$$

(where $\phi$ is a pre-determined power factor angle representing a desired phase shift between the current delivered by the inverter and the AC grid voltage). The PV cell 102 voltage and current may be measured in some applications, and, in such embodiments, alternative formulations for the commanded duty cycle may therefore include:

$$d = d_0 - (1-d_0)\frac{P_{out}}{2\omega V_{bus0}^2 C_{bus}\cos(\phi)}\sin(2\omega t), \quad (19A)$$

$$d = d_0 - (1-d_0)\frac{V_s I_s}{2\omega V_{bus0}^2 C_{bus}\cos(\phi)}\sin(2\omega t), \quad (19B)$$

and $$d = d_0 - (1-d_0)\frac{P_s}{2\omega V_{bus0}^2 C_{bus}\cos(\phi)}\sin(2\omega t). \quad (19C)$$

In the following description, certain modifications and alterations to the formulation given by Equation 19 will be discussed. However, it should be appreciated that those modifications and alterations are equally applicable to the formulations of Equations 19A through 19C, as well as to any equivalent formulations.

While the equations derived above are based on the non-isolated boost converter shown in FIG. 1, they are also valid for an isolated boost converter (see, e.g., boost converter 162 of FIG. 9) because the division of $\tilde{V}_{bus}$ by $V_{bus0}$ (Equation 11) cancels out the effect of the isolation transformer turns ratio, n.

It should be appreciated that in the input converter controller 120b of FIG. 3, the wideband ACM feedback loop 126 and the feedback controller 124 are eliminated. Additionally, the determination of the duty cycle correction term, $\tilde{d}$ (Equation 18), may be performed in firmware. Elimination of the wideband ACM current loop 126 may also eliminate the need to perform a wideband measurement of $\tilde{i}_s$, enabling $\tilde{i}_{pv}$ to be used instead of $\tilde{i}_s$ as the input to the MPPT controller 132 (e.g., as shown in FIG. 3). Because, in practice, $\tilde{i}_{pv}$ may be a "cleaner" signal than $\tilde{i}_s$, and because the measurement bandwidth requirement may be relaxed, board layout and current sensing may be simplified.

In theory, controlling the input duty cycle, d, in conformance with Equation 19 may result in substantially zero reflected double-frequency ripple across the PV cell 102. In practice, however, a number of factors may cause the attenuation to be imperfect, including voltage and current measurement tolerances and errors; firmware-induced calculation errors; and unit-to-unit variations in the initial value, as well as time, temperature, and voltage-induced variations in the operating value of $C_{bus}$ 187 that may cause the actual circuit value of $C_{bus}$ to differ from the estimated value used to calculate $\tilde{d}$ (e.g., in Equation 18). Likewise, if PV cell 102 power is used in calculating $\tilde{d}$ (e.g., as in Equations 19A and 19B) variations in the actual operating value of inverter circuit efficiency may cause the actual value of $\eta$ to differ from the estimated value used to calculate $\tilde{d}$ (e.g., in Equations 19A, 19B). It should be appreciated that the preceding analysis also assumes there is no phase shift between input-reflected ripple disturbances and the AC grid 104. In practice, however, phase shift may be introduced by isolation transformers (in an isolated inverter, see, e.g., transformer 175 in isolated converter 162 of FIG. 9) and by the inverter output filter 110, or it may be purposely introduced as a power factor angle, $\phi$, representing a desired amount of phase shift between the AC grid voltage and the current delivered by the inverter. Because Equation 19 assumes zero phase shift, and does not take such magnitude and phase effects into account, the calculated value of $\tilde{d}$ may result in sub-optimal attenuation of reflected ripple. Thus, in practice, both magnitude and phase errors may contribute to errors or other imperfections in the calculation of $\tilde{d}$ and these errors and imperfections may result in degradation in attenuation of the input-reflected double-frequency ripple.

Figure 4:
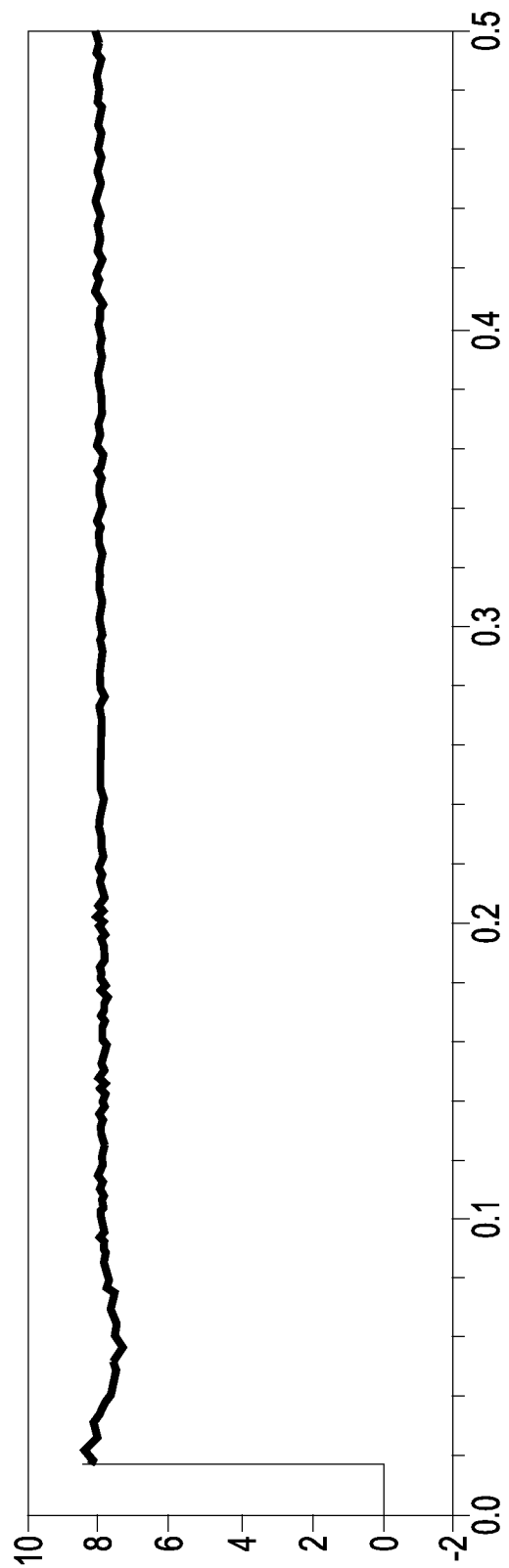
FIGS. 4 through 6 illustrate simulated inverter waveforms for the inverter of FIG. 9.
Figure 5:
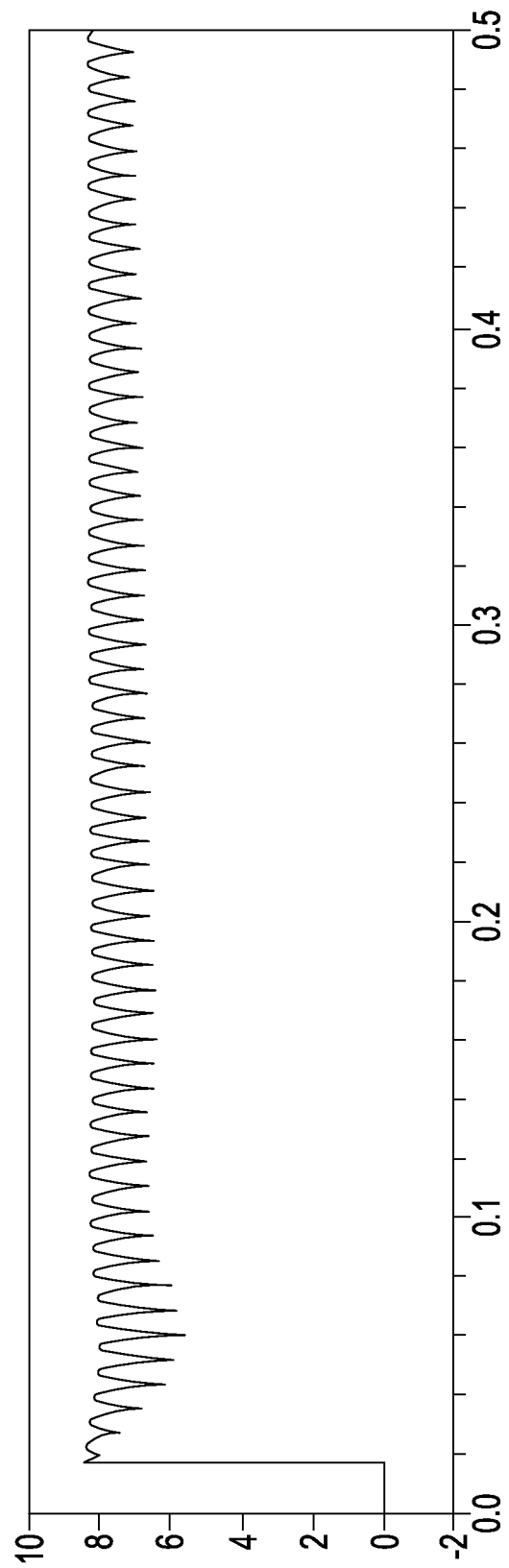
Figure 6:
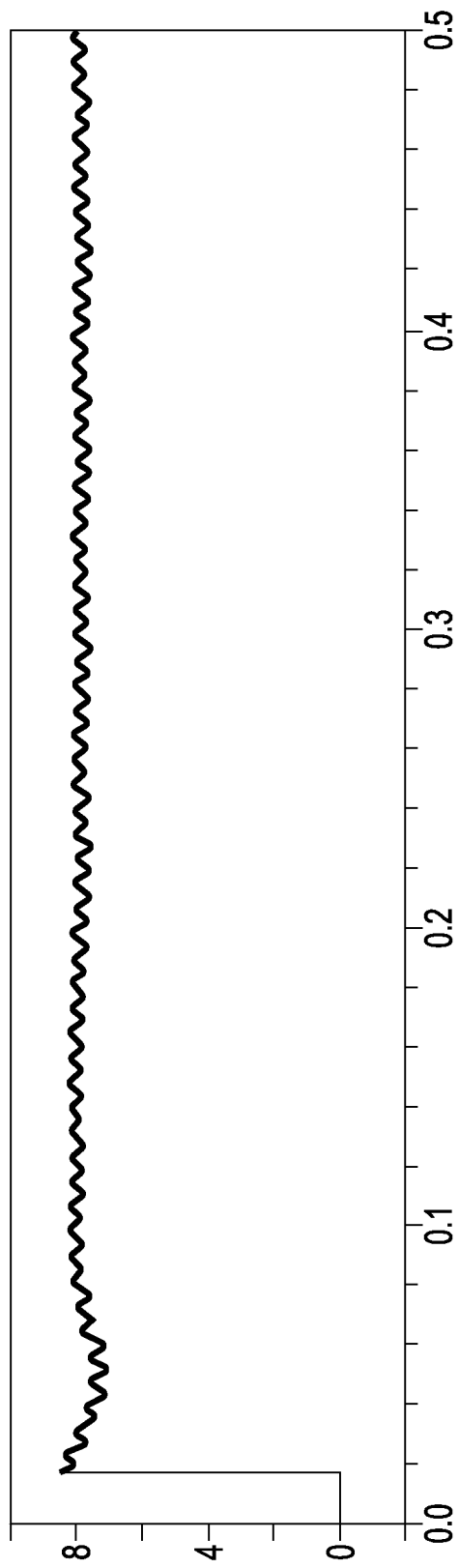
Figure 9A:
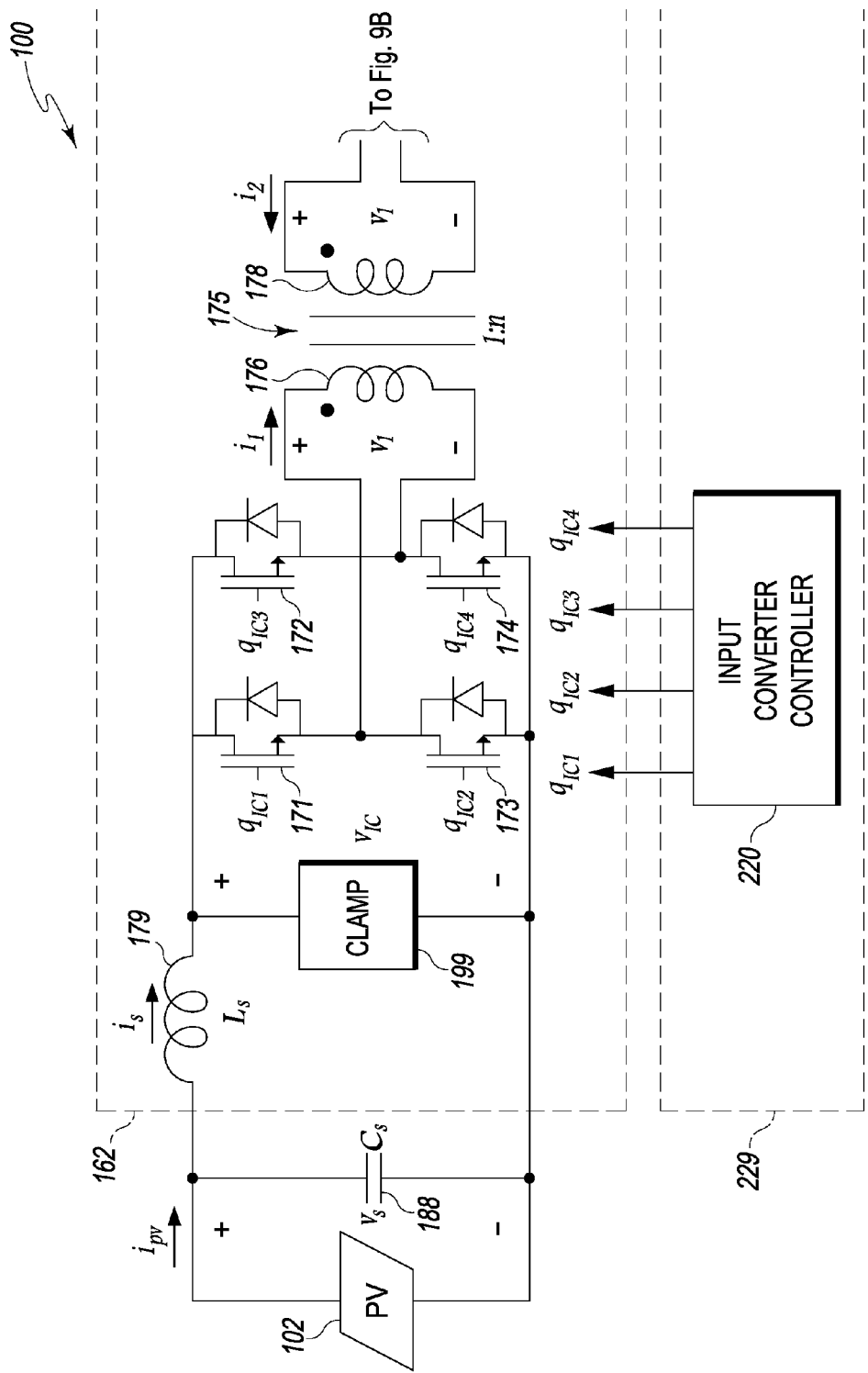
FIG. 9 is a schematic of another embodiment of a DC-to-AC inverter.
Figure 9B:
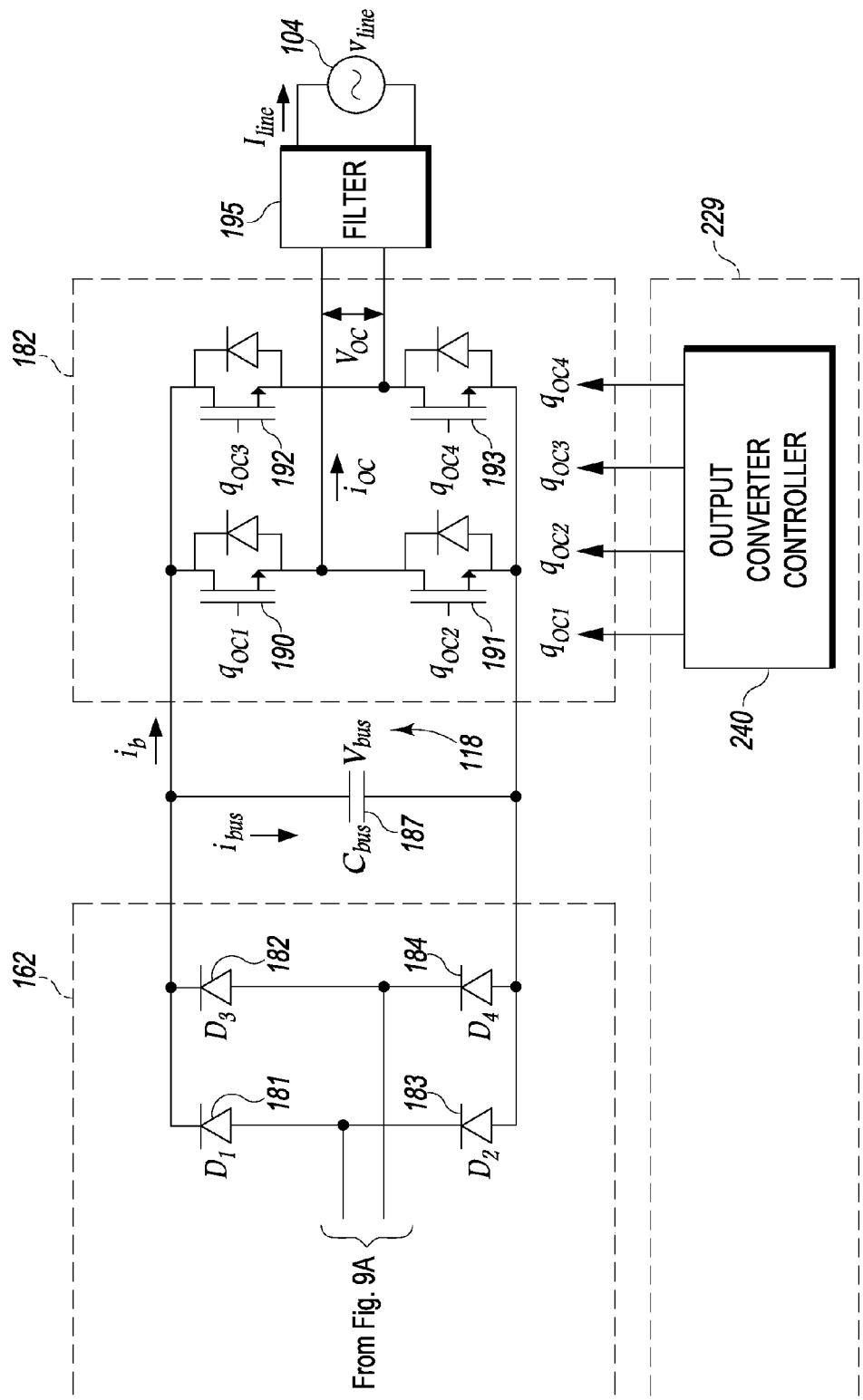

In an example of the effect of circuit parameter variation, simulations were performed for an inverter 200 of the kind shown in FIG. 9, with a controller of the kind shown in FIG. 3, the results of which are illustrated in FIGS. 4-6. The inverter of FIG. 9 includes an isolated boost switching power converter 162 that receives power from PV cell 102 and delivers power to DC bus 118 at a nominal voltage of 400 VDC. Additionally, in the simulated embodiment, $C_{bus}$=23.4 microfarads and $L_s$=44 microhenries. The MPPT 132 algorithm used in the simulations performs a conventional hill-climbing algorithm that updates once in every AC line cycle with a step change of 0.1 V. The graph of FIG. 4 shows ripple in the PV cell current, $i_{pv}$, with all of the parameters in Equation 19 set equal to their corresponding values in the inverter circuit 100. The graph of FIG. 5 shows ripple in $i_{pv}$ with the FFAF disabled (i.e., correction term $\tilde{d}$=0). The graph of FIG. 6 shows ripple in $i_{pv}$ with the FFAF enabled and all of the parameters used in Equation 19 set equal to their corresponding values in the inverter circuit 100, with the exception of the value of $C_{bus}$ which, in the converter circuit, is reduced to 70% of the nominal value used in Equation 19. Comparison of FIGS. 4 and 5 illustrates that an increased input ripple cancellation may be achieved if FFAF calculation parameters conform to their corresponding circuit parameters, whereas comparison of FIGS. 6 and 4 illustrates that differences between circuit parameters and FFAF calculation parameters may cause degradation in the ripple-reduction performance of an FFAF controller 136.

Figure 7:
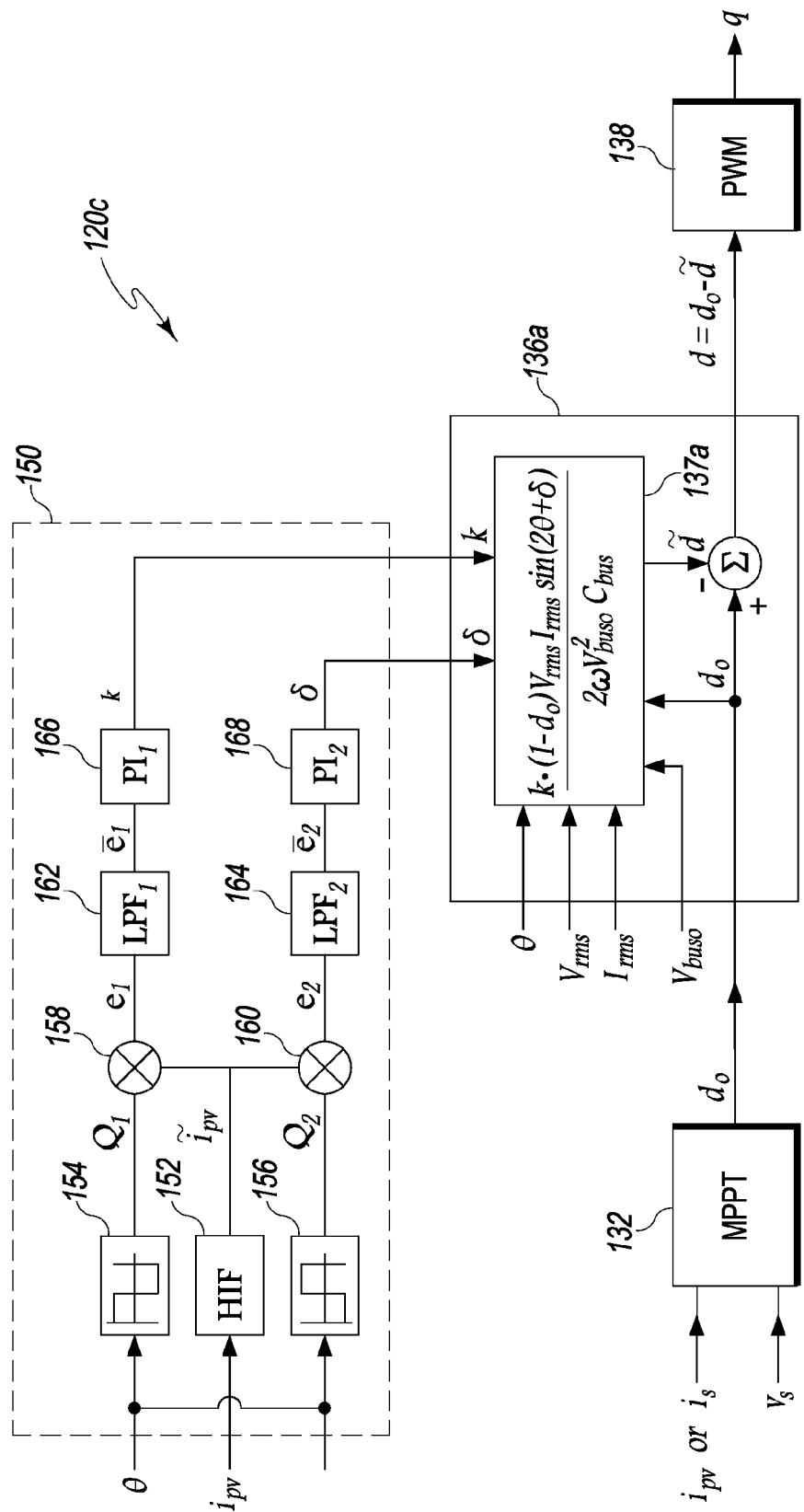
FIG. 7 is a block diagram of another embodiment of an input current controller for the inverters of FIGS. 1 and 9.

Referring now to FIG. 7, in another embodiment, the input converter controller 120 may be embodied as an input converter controller 120c, which is configured to automatically compensate for magnitude and phase errors that would otherwise contribute to errors or other imperfections in the calculated value of $\tilde{d}$. The input converter controller 120b includes a FFAF block 136a having a calculation block 137a configured to calculate a value of $\tilde{d}$ that is modified, relative to the value calculated by Equation 18, by inclusion of a phase correction term, $\delta$, and a gain correction term, k:

$$\tilde{d} = k(1-d_0)\frac{V_{rms}I_{rms}}{2\omega V_{bus0}^2 C_{bus}}\sin(2\omega t + \delta). \quad (20)$$

The correction terms, $\delta$ and k, are provided by a quadrature correction block 150, which receives measurements of the AC grid phase, $\theta$=$\omega$t, and the PV cell 102 current $i_{pv}$. A high-pass filter 152 extracts the double-frequency ripple component, $\tilde{i}_{pv}$, from $i_{pv}$. The quadrature signals $Q_1$ and $Q_2$, delivered, respectively, by phase comparator blocks 154, 156 are defined as:

$$Q_1 = \begin{cases} 1 & \text{if } 0 < \text{mod}(\omega t, \pi) < \frac{\pi}{2} \\ -1 & \text{otherwise} \end{cases} \quad (21)$$

$$Q_2 = \begin{cases} 1 & \text{if } \frac{\pi}{4} < \text{mod}(\omega t, \pi) < \frac{3\pi}{4} \\ -1 & \text{otherwise} \end{cases} \quad (22)$$

where the function mod(x,y) returns the remainder of the division of x by y (said another way, for y≠0, mod(x,y) has a value w such that x=P·y+w, where P is an integer and w<y).

Various waveforms of the input converter controller 120 are illustrated in FIGS. 8a-8c. The graph of FIG. 8A shows the waveform of the AC grid voltage, $V_{line}$ (FIG. 8A). Additionally, the graph of FIG. 8B shows the waveform for $Q_1$ (FIG. 8B) and the graph of FIG. 8C shows the waveform for $Q_2$ (FIG. 8C). As illustrated in FIGS. 8B and 8C, both signals $Q_1$ and $Q_2$ have zero average value and a fundamental frequency equal to twice the AC grid frequency (which corresponds to the frequency of the double-frequency ripple).

It should be appreciated that if only the phase, but not the magnitude, of the calculated value of $\tilde{d}$ is incorrect, the locations of the peaks of the resultant double-frequency ripple, $\tilde{V}_{bus}$, will shift in phase (relative to the phase of the AC grid, $\omega$t) as a function of the amount of phase error. If the phase of $\tilde{d}$ is adjusted towards a correct value at which the ripple goes to zero, however, the phase shift in the locations of the peaks of $\tilde{d}$ will converge on $\pi/4$ (and the magnitude of $\tilde{V}_{bus}$ will converge on zero).

Likewise, if only the magnitude, but not the phase, of the calculated value of $\tilde{d}$ is incorrect, the locations of the peaks of the resultant double-frequency ripple, $\tilde{V}_{bus}$, will shift in phase as a function of the amount of magnitude error. If the magnitude of $\tilde{d}$ is adjusted towards a correct value at which the ripple goes to zero, however, the phase shift in the locations of the peaks of $\tilde{d}$ will converge on $\pi/2$ (and the magnitude of $\tilde{V}_{bus}$ will converge on zero).

Referring to FIGS. 8C, 8D and 8E, if the signal $Q_2$ (see FIG. 8C) is multiplied by a double-frequency sinusoid (see FIG. 8D) having peaks whose locations are shifted in phase (relative to the zero phase point of the AC grid in FIG. 8A) by $\pi/4$, the resultant waveform (FIG. 8E) will have zero average value. Likewise, if the signal $Q_1$ (FIG. 8B) is multiplied by a double-frequency sinusoid having peaks whose locations are shifted in phase by $\pi/2$ (not shown), the resultant waveform will also have a zero average value. Therefore, it can be appreciated that when both the phase and magnitude of $\tilde{d}$ are correctly adjusted to produce essentially zero double-frequency ripple, the error signals $e_2 = Q_2 \cdot \tilde{i}_{pv}$ and $e_1 = Q_1 \cdot \tilde{i}_{pv}$ will each have zero average value.

Referring back to FIG. 7, low-pass filters $LPF_1$ 162 and $LPF_2$ 164 (FIG. 7) filter the double-frequency (and higher) ripple components from $e_1$ and $e_2$, producing average error values $\overline{e_1}$ and $\overline{e_2}$, respectively. Proportional-integral (PI) filters $PI_1$ 166 and $PI_2$ 168 generate correction terms k and $\delta$ from $\overline{e_1}$ and $\overline{e_2}$, respectively. As the magnitude and phase of $\tilde{d}$ diverge from the values required to eliminate the double-frequency ripple, one or the other, or both, of the signals $\overline{e_1}$ and $\overline{e_2}$ will diverge from zero and the output of the corresponding one (or both) of PI filters $PI_1$ and $PI_2$ will change, thereby changing one or the other, or both of the correction terms, k and $\delta$, until the ripple has been controlled to be zero, after which the error values $\overline{e_1}$ and $\overline{e_2}$ will once again be zero and the values of k and $\delta$ will stop changing.

In operation, the quadrature corrector assesses the effectiveness of the calculation of $\tilde{d}$ (e.g., the effectiveness of the calculation block 137a in feedforward controller 136a) in attenuating the double-frequency ripple and adaptively alters the calculation (e.g., by adjusting the magnitude and phase of $\tilde{d}$) to improve the effectiveness of attenuation. By "tuning" the magnitude and phase of $\tilde{d}$, quadrature correction may compensate for parametric or measurement tolerances and errors that might otherwise compromise the effectiveness of feedforward compensation alone (FIG. 3).

It should be appreciated that by using quadrature correction one or more features of the input converter controller may be obtained including: elimination of a wideband current loop (e.g., ACM block, FIG. 2) from the input converter controller and the attendant need for wideband current sensing and a wideband current sensor; simplified printed circuit board layout; simplification of control algorithms; ease of implementation in firmware; and more effective control action owing to the controllers ability to automatically adapt to parameter drift and computation tolerances and errors. In inverters in which a measurement of PV cell power is used in performing feedforward correction (e.g., using Equations 19A, 19B), the quadrature corrector will also be effective in compensating for variances between actual inverter circuit efficiency and the value of η used in calculating $\tilde{d}$. Thus, use of quadrature correction may enable effective use of PV cell power, instead of inverter output power, in performing feedforward correction, thereby eliminating the need to pass measurements of AC grid voltage and current to the feedforward calculation block.

Referring now to FIGS. 9-12, an illustrative inverter 200 is shown. The illustrated inverter 200 may be configured to deliver 225 Watts from a PV cell 102 to an AC grid 104 at a grid voltage $V_{rms}$=240 Volts, rms. In FIG. 9, an isolated boost switching converter 162 receives power from the unipolar input source 102 at voltage $V_s$ (e.g., $V_s$=25 Volts) and current $i_s$. Isolated boost converter 162, comprising input inductor 179 (e.g., $L_s$=44 microhenries), voltage clamp 199, and transformer 175, is one of several possible current-fed converter topologies that may be used. The voltage clamp 199 clamps the voltage applied to the bridge circuit formed by the switches 171-174. The voltage clamp 199 may be embodied as a passive or active circuit. For example, in embodiments wherein the voltage clamp 199 is a passive circuit, a parallel diode and RC circuit may be used. The illustrative transformer 175, comprising primary winding 176 and secondary winding 178, provides galvanic isolation between the primary side converter circuitry (including input source 102) and the secondary side circuitry (including unipolar bus 118). The turns ratio of the transformer, n, (e.g., n=10) may also provide voltage and current transformation between the input source and the unipolar bus.

The inverter 200 further includes an inverter controller 229 comprising an input converter controller 220 and an output converter controller 240. The switches 171-174 in boost converter 162 are turned on and off, by gate signals $q_{Ic1}$ through $q_{Ic4}$, delivered from input converter controller 220, at relatively high switching frequency (e.g., at a frequency that is substantially higher than the AC grid frequency). Power is transferred to the unipolar output bus 118 via isolation transformer 175 and rectifiers 181-184. A bus filter capacitor 187 across the unipolar bus provides energy storage and filtering (e.g., $C_{bus}$=23.4 microfarads). A PV cell filter capacitor 188 is also provided across PV cell 102 (e.g., $C_s$=4.7 microfarad).

Figure 10A:
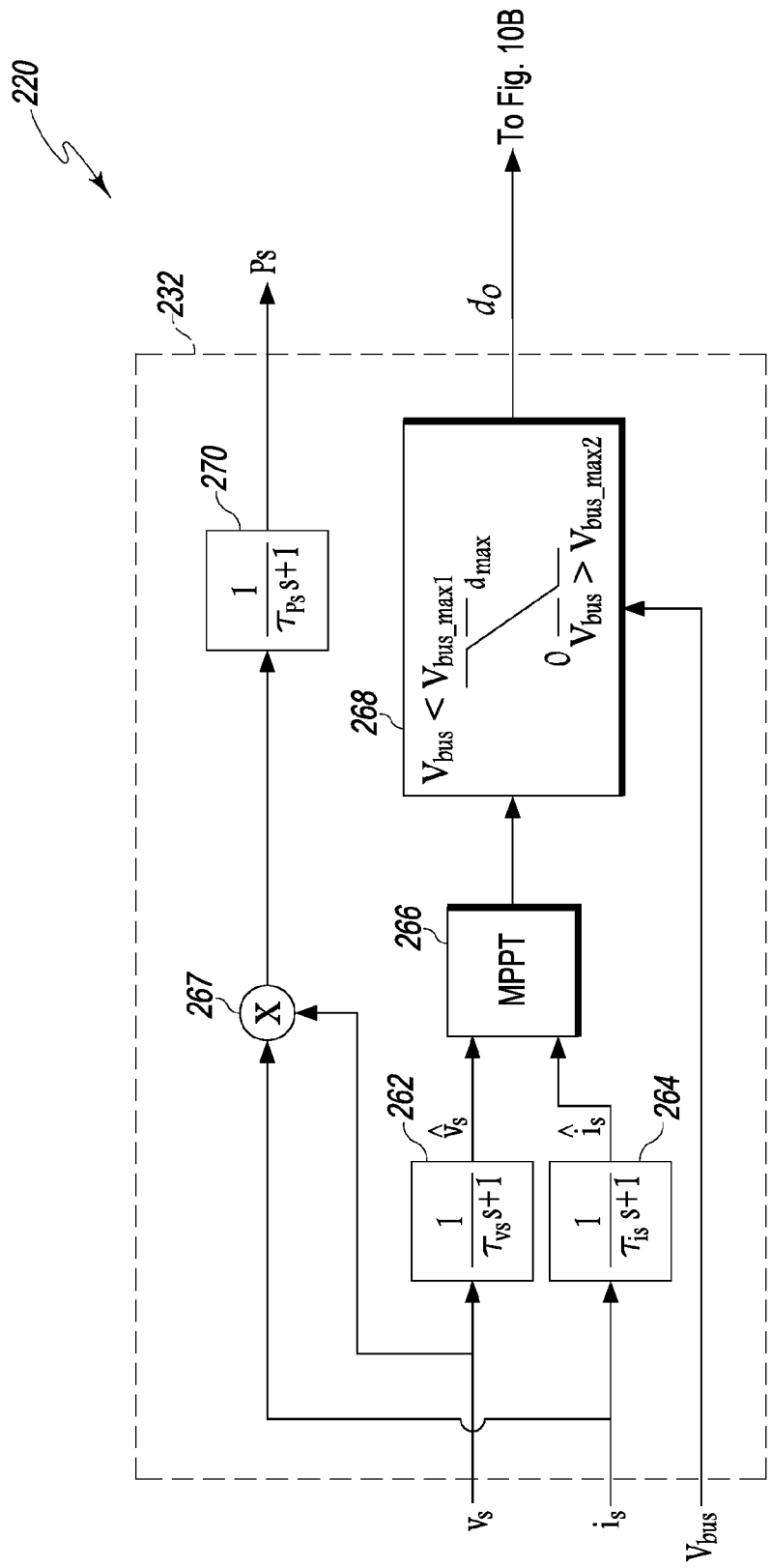
FIG. 10 is a block diagram of another embodiment of an input current controller for the inverter of FIG. 9.
Figure 10B:
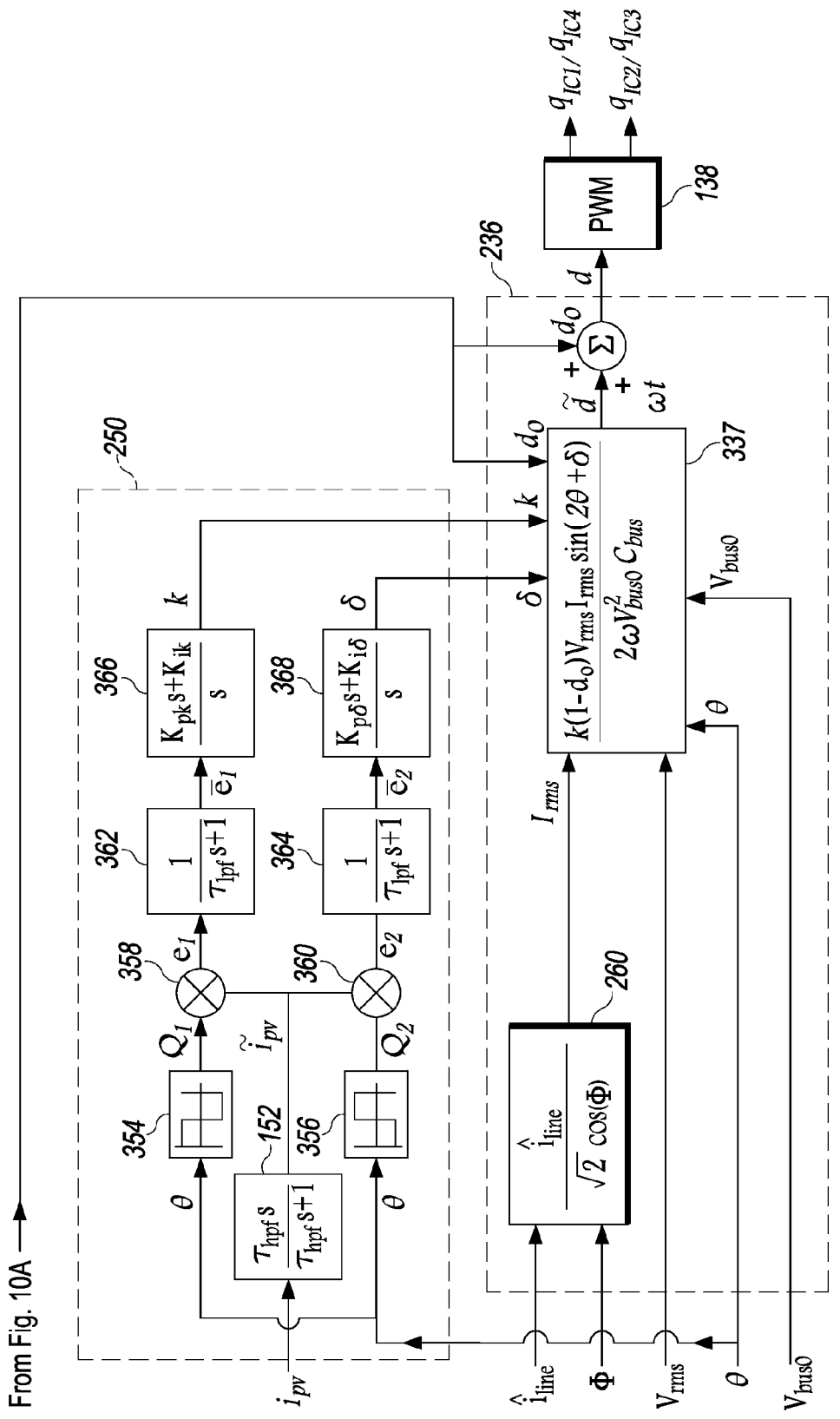

As illustrated in FIG. 10, the input converter controller 220 includes a maximum power point tracking (MPPT) controller 232; a feedforward active filter (FFAF) 236; and a quadrature corrector 250. PWM control block 138 receives a duty cycle command, d, from feedforward active filter (FFAF) block 236 and generates signals, $q_{Ic1}$ through $q_{Ic4}$, suitable to operate switches 171-174 at the indicated duty cycle.

The MPPT controller 232 receives measured values of the PV cell 102 voltage, $V_s$, PV cell current, $i_{pv}$, and the unipolar bus voltage $V_{bus}$. Low-pass filters 262, 264 (e.g., $\tau_{vs}$=1/(4000π); $\tau_{is}$=1/(4000π)) remove noise from the signals and deliver filtered signals, $\hat{V}_s$ and $\hat{i}_s$, to MPPT algorithm block 266. The MPPT algorithm adjusts $d_0$ (using any of many known MPP algorithms) to a duty cycle, $d_0$, at which the PV cell delivers its maximum power, $P_{mpp}$. Multiplier 267 generates the product of the instantaneous values of $V_s$ and $i_s$, indicating the instantaneous power delivered by PV cell 102; low-pass filter 270 receives the signal output of multiplier 267 generate a filtered signal, $P_s$=LPF($V_s i_s$) indicating the instantaneous power being delivered by PV cell 102.

The MPPT controller 232 may also include a limiting function 268 that may, depending on the value of the unipolar bus voltage, $V_{bus}$, set an upper limit, $d_{max}$, on the value of $d_0$. For example, as shown in FIG. 10, if $V_{bus}$ is below a predetermined value, $V_{bus\_max1}$ (e.g., 450 V), there may be substantially no limit on the allowable maximum operating value of $d_0$ (e.g., $d_{max}$=0.98). As $V_{bus}$ rises above $V_{bus\_max1}$, however, the value of $d_0$ may be progressively reduced until, at a bus voltage at or above $V_{bus\_max2}$ (e.g. 500 V) it may be reduced to substantially zero. By this means, power delivered by the input converter may be throttled back if the unipolar bus voltage rises above a defined limit, which might occur, for example, in the event of a rapid change in load or a grid fault.

Figure 11:
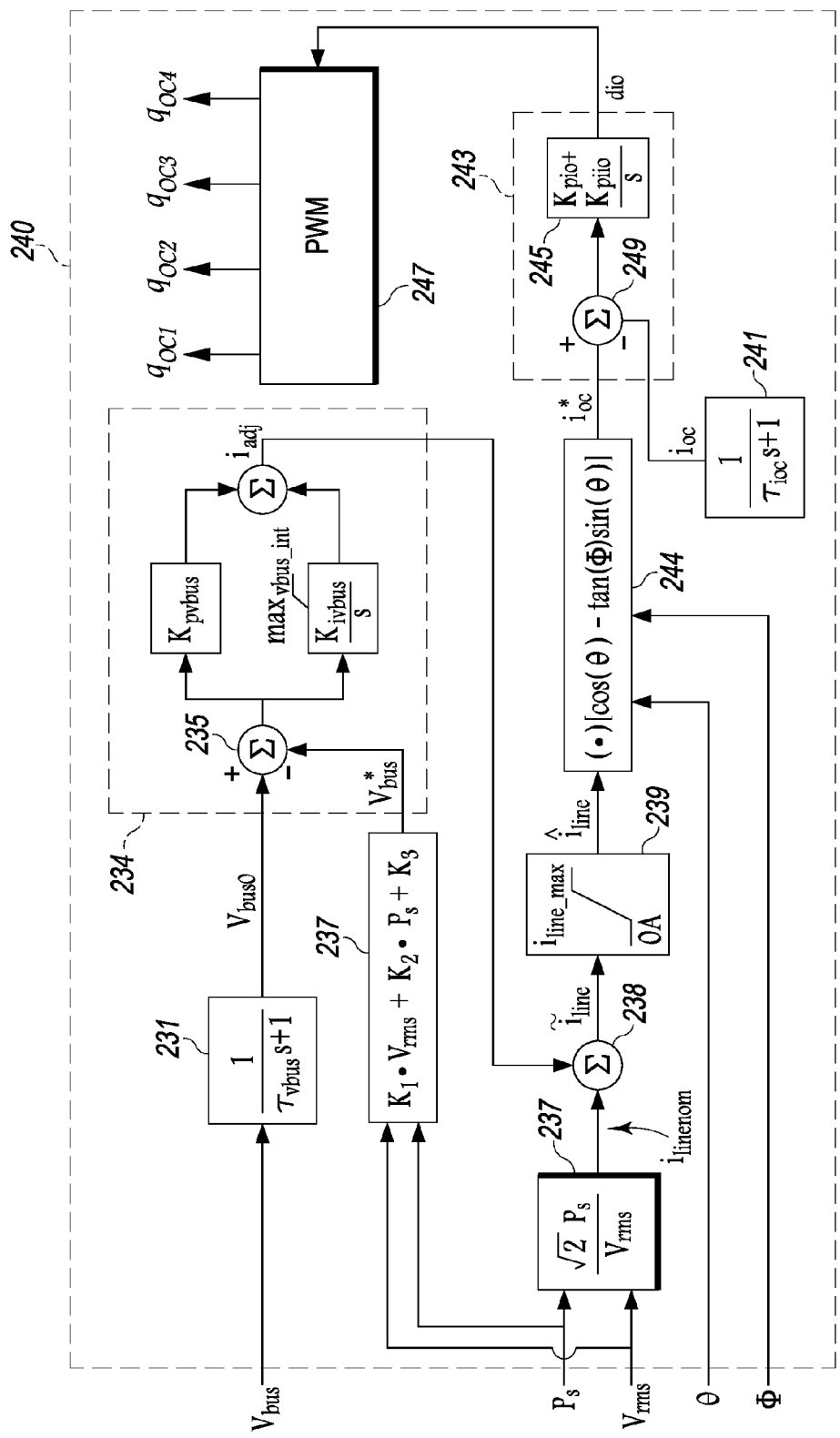
FIG. 11 is a block diagram of one embodiment of an output current controller for the inverter of FIG. 9.

The FFAF block 236 receives the value of $d_0$ from the MPPT and also receives signals $V_{line}$, $V_{bus0}$, and θ=ωt=(2πf)(t), indicative of, respectively, the root-mean-square (rms) value of the AC grid voltage, $V_{line}$, the average value of the unipolar bus voltage, $V_{bus}$, and the phase of the AC grid. Because, in some applications, it may be desirable to shift the phase of the inverter output current, $I_{line}$, relative to the phase, ωt, of the AC grid 104, the FFAF block 236 also receives a power factor angle command, φ, and a signal, $\hat{i}_{line}$ (received from output current controller 240 as shown in FIG. 11, and indicative of the peak value of the AC current that the output controller 240 is commanding to be delivered to the AC grid 104) and calculates, in calculation block 260, the corresponding rms value of the line current, $$I_{rms} = \frac{\hat{i}_{line}}{\sqrt{2}\cos(\phi)}$$

that is required to deliver the indicated power, $P_s$ (see FIGS. 10 and 11), at the indicated power factor angle, φ. Using these measured and calculated values, and the phase and gain correction signals, k and δ, delivered to the FFAF block 236 from quadrature corrector 250, computation block 337 calculates a time-varying correction term, $\tilde{d}$, that is added to the nominal duty cycle, $d_0$, to generate the input converter duty cycle signal, $d=\tilde{d}+d_0$, all as previously described with respect to FIGS. 3 and 7. The FFAF block 236 delivers the input converter duty cycle signal, d, to the PWM controller 138, which operates the input converter switches 171-174 at the indicated duty cycle, d.

Quadrature corrector 250, which may operate as described above with respect to FIG. 7, may comprise high pass filter 152 (e.g. $\omega_{hpf}$=1/(24π) rad/s); phase comparator blocks 354, 356 having, respectively, the transfer functions defined in Equations 21 and 22, above; multipliers 358, 360; low pass filters 362, 364 (e.g., $\omega_{lpf}=1/(24\pi)$ rad/s); and proportional-integral filters 366, 368 (e.g., $K_{pk}$=0.15 and $K_{ik}$=27.5; $K_{p\delta}$=0.25 and $K_{j\delta}$=5).

Figure 12:
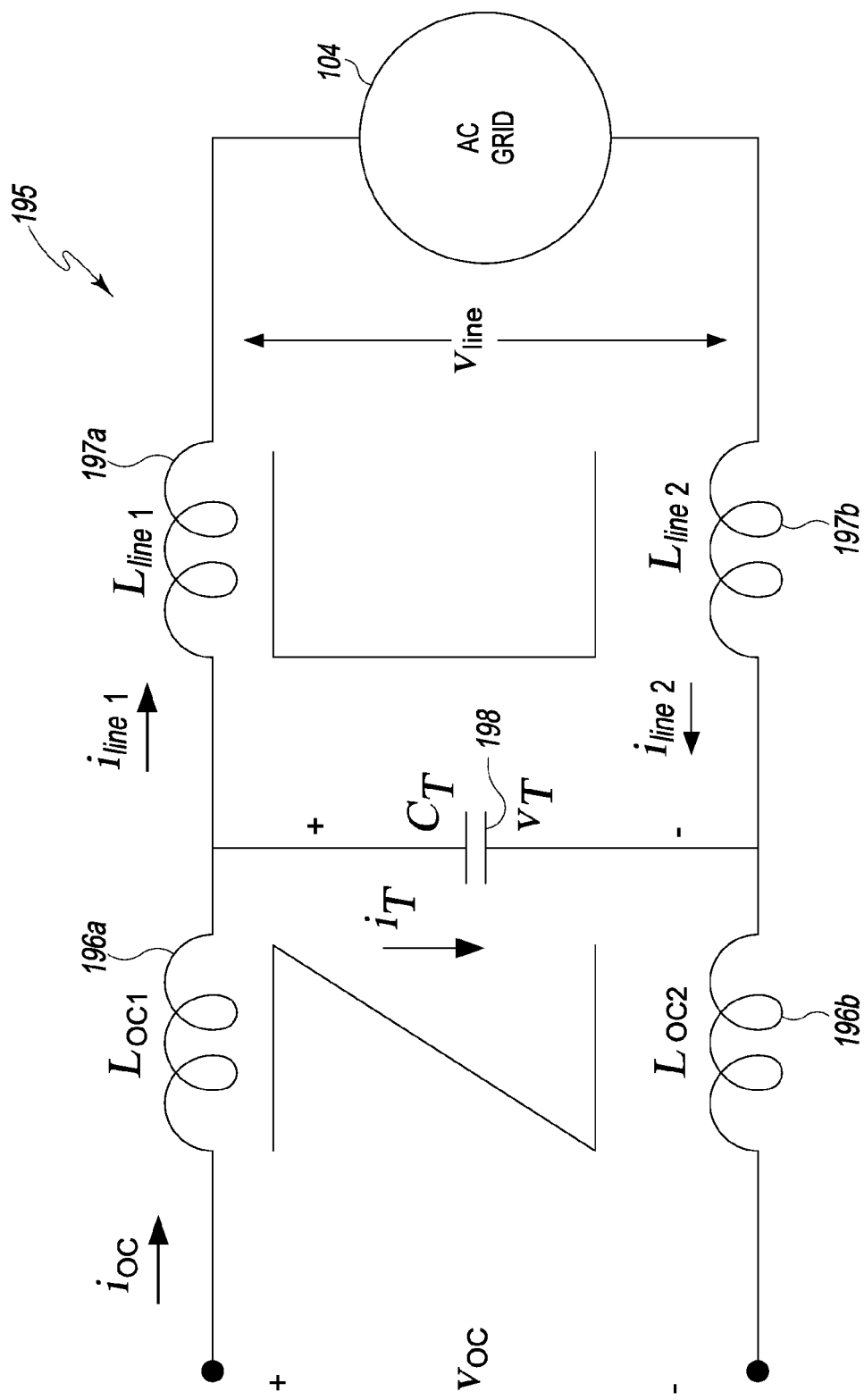
FIG. 12 is a simplified schematic of one embodiment of an output filter for the inverter of FIG. 9.

Referring back to FIG. 9, an output converter 182 is embodied as a non-isolated full-bridge switching converter, comprising switches 190-193 that are controlled by output converter controller 240. The full-bridge configuration enables the output converter 182 to deliver a bipolar voltage, $V_{oc}$, and bipolar current $i_{line}$. An output filter 195, may be interposed between the output of the output converter 182 and the AC grid 104, to filter the voltage $v_{oc}$ as a means of reducing conducted interference and satisfying regulatory requirements. As shown in FIG. 12, the filter 195 may comprise differential-mode inductors, $L_{OC1}$ 196a and $L_{OC2}$ 196b, a common-mode inductor $L_{line1}$-$L_{line2}$ 197a, 197b, and line filter capacitor $C_T$ 198.

A block diagram of an embodiment of the output converter controller 240 for use in an inverter according to the present disclosure is shown in FIG. 11. The output converter controller 240 controls the magnitude and phase of the sinusoidal AC current, $i_{oc}$, that is delivered by output converter 182 and also controls the average value of the unipolar bus voltage, $V_{bus0}$. The controller 240 receives measured values of the unipolar bus voltage $V_{bus}$, the converter output current $i_{oc}$, the rms value of the AC grid line voltage $V_{line(rms)}$, and the phase of the AC grid, θ. Controller 240 also receives the commanded power factor angle φ, and the value of PV cell power, $P_s$ (received from MPPT controller 232 (FIG. 10)).

Low-pass filter 231 (e.g., $\omega_{lpf}=1/(20\pi)$) extracts the average value, $V_{bus0}$, of the unipolar bus voltage $V_{bus}$, and delivers a measured average value of the unipolar bus voltage to the input of PI feedback controller 234 (e.g., $K_{pvbus}$=0.00375 A/V; $K_{ivbus}$=0.1 A/V·s), where it is compared to the commanded value of the average value of the unipolar bus voltage, $V_{bus}^*$, by summing junction 235. Differences between the commanded average value and the measured average value of $v_{bus}$ are reflected as variations in the signal output of the feedback controller, $i_{adj}$, which is delivered as an input to summing junction 238. The other input of summing junction 238 is a calculated nominal value for the line current, $$i_{linenom} = \frac{\sqrt{2}\, P_s}{V_{line(rms)}},$$

delivered by calculator block 237. $i_{linenom}$ represents the ideal peak value of line current, at zero power factor, that would result in the output power being equal to the input power. Summing junction 238 adds $i_{adj}$ to $i_{linenom}$ to produce control signal $\tilde{i}_{line}$.

Ignoring, for the moment, the positive signal limiter 239, the signal $\tilde{i}_{line}$ is received at the input of sinusoidal signal generator 244 as the signal $\hat{i}_{line}$. The sinusoidal signal generator 244 generates the sinusoidal, time-varying output current command $i_{oc}^*$:

$$i_{oc}^* = \hat{i}_{line} \cdot (\cos(\omega t) - \tan(\phi) \cdot \sin(\omega t)) =$$
$$\hat{i}_{line} \cdot \cos(\omega t + \phi)/\cos(\phi) \qquad (23)$$

$$i_{oc}^* = i_{linenom} \cdot \cos(\omega t + \phi)/\cos(\phi) +$$
$$i_{adj} \cdot \cos(\omega t + \phi)/\cos(\phi) = iff(t) + ifb(t) \qquad (24)$$

$i_{oc}^*$ consists of two components, a feedforward component, $$iff(t) = i_{linenom}\frac{\cos(\omega t + \phi)}{\cos(\phi)},$$

representing the ideal time-varying line current that would result in delivery of Ps watts to the AC grid at the power factor angle φ, and a feedback component, $$ifb(t) = i_{adj}\frac{\cos(\omega t + \phi)}{\cos(\phi)},$$

that is adjusted by feedback controller 234 to ensure that the inverter output power and input power are balanced, as explained below.

In operation, the power delivered to the AC grid should be equal to the power delivered by the solar cell, less the total of circuit and other losses, else the unipolar bus voltage may go out of control. If too little power is delivered to the grid, the bus voltage will rise; if too much is delivered, the bus voltage will fall. Because the calculated nominal value of line current, $i_{linenom}$, is subject to measurement and calculation errors and cannot accurately account for the range of possible variations in circuit losses and other factors that affect power delivery, $i_{line}$ cannot be controlled by feedforward control alone.

During steady-state operation, variations in power delivered by the output converter may result in a variation in the average value of the unipolar bus voltage. For example, if the power delivered by the output stage is low relative to the power delivered by the input converter, the unipolar bus voltage will tend to increase. This increase will cause the output of feedback controller 234, $i_{adj}$, to increase, thereby increasing the magnitudes of ifb(t) and $i_{oc}^*$ (Equation 24) and increasing the power delivered to the AC grid 104. By this feedback process, the power delivered to the AC grid 104 will be adjusted so that power flow from input to output is properly balanced and so that the average value of the unipolar bus voltage is controlled to be at its commanded value, $V_{bus}^*$.

The output current command, $i_{oc}^*$, is delivered by sinusoidal signal generator 244 to summing junction 249 in PI controller 243 (e.g., $K_{pio}$=0.45 A/V and $K_{iio}$=5500). A filtered (by low pass filter 241, e.g., $\tau_{ioc}=1/(6000\pi)$) measurement of the output converter output current, $\hat{i}_{oc}$, is delivered to the other input of summing junction 249. PI controller 243 delivers a duty cycle command $d_{io}$ to PWM controller 247. By this means, the PI controller 243 may adjust the duty cycle of output converter 182 so that the value of the output current $i_{oc}$ is controlled to be at the value commanded by $i_{oc}^*$.

Referring again to FIG. 11, a bus voltage command calculator block 237 may be provided to adaptively adjust the value of $V_{bus}^*$, and hence the value of $V_{bus0}$, as a function of selected variables. For example, reducing $V_{bus}^*$ in response to a reduction in $V_{line(rms)}$ may improve overall inverter operating efficiency. One example of a bus voltage command calculator block 237 is shown in FIG. 11, in which the commanded value, $V_{bus}^*$ is a function of $V_{line}$ and $P_s$ (e.g., $K_1$=1, $K_2$=30/225 and $K_3$=120). Positive signal limiter 239 may be used to ensure that the command signal, $\hat{i}_{line}$, delivered to sinusoidal signal generator 244, cannot be negative; it may also limit the commanded value, $\hat{i}_{line}$, to be no greater than a pre-determined $i_{line\_max}$ (e.g., $i_{line\_max}$=2 Amperes).

Simulation waveforms for the inverter of FIGS. 9-12 are illustrated in FIG. 13. The graph of FIG. 13A shows a gain correction term, k. The graph of FIG. 13B shows a phase correction term δ. The graph of FIG. 13C shows error signal $e_1$ 422 and average error value 424. The graph of FIG. 13D shows error signal $\overline{e_2}$ 426 and average error value $e_2$ 428. The simulation waveforms are for operation with a circuit value of $C_{bus}$ set equal to 16.38 microfarads, which is 70% of the value (23.4 microfards) used in performing the calculation of d within computation block 337; PV cell 102 input voltage $V_s$=25 Volts; PV cell MPP=225 Watts; cell filter capacitor 188, $C_s$=4.7 microfards; unipolar bus filter capacitor 187;

$C_{bus}$=16.38 microfarads; input inductor 179; $L_s$=44 microhenries; transformer 175 turns ratio, n=10; average unipolar bus voltage, $V_{bus0}$=400 Volts; in the MPPT 232, $\tau_{vs}$=$\tau_{is}$=$\tau_p$=1/(4000π); in the quadrature corrector 250, $\omega_{hpf}$=$\omega_{lpf}$=1/(24π) rad/sec, and $K_{pk}$=0.15 and $K_{jk}$=27.5, $K_{p\delta}$=0.25 and $K_{i\delta}$=5; in the output controller 240, $\omega_{vbus}$=1/(20π) rad/sec, $K_{pvbus}$= 0.00375 A/V, $K_{ivbus}$=0.1 A/V·s, $i_{line\_max}$=2 Amperes, and $K_1$=1, $K_2$=30/225 and $K_3$=120; AC grid voltage, $V_{line(rms)}$= 240 Volts rms; AC grid frequency=2π(60) rad/sec; in the output filter 195 (FIG. 12) $L_{OC1}$=$L_{OC2}$=3 millihenries, $C_T$=330 nanofarads, $L_{line1}$=1.25 millihenries, and $L_{line2}$=0.

As shown in FIGS. 13A and 13B, k is set to an initial value of 1 and δ is set to an initial value of 0 radians. In operation, the quadrature corrector 250 increases the value of k from an initial value of 1 to a final value of 1.4, which compensates for the use of a value of $C_{bus}$ in calculation block 137 that is 1.4 times larger than the value use in the circuit; the quadrature corrector 250 also increases the value of δ from an initial value of 0 radians to a final value of 0.013 radians (too small an amount to be visible in FIG. 13B), which compensates for phase shift in the inverter (e.g., phase shift in the output filter 195). The duration of one cycle of the AC grid 104, $T_{line}$=1/60 sec, is shown FIG. 13B. As shown in FIGS. 13C and 13D, both error signals, and their respective average values, converge rapidly and smoothly toward their final values. Convergence is substantially complete in a time period that is not much longer than two line cycles (i.e., $2T_{line}$).

Figure 14:
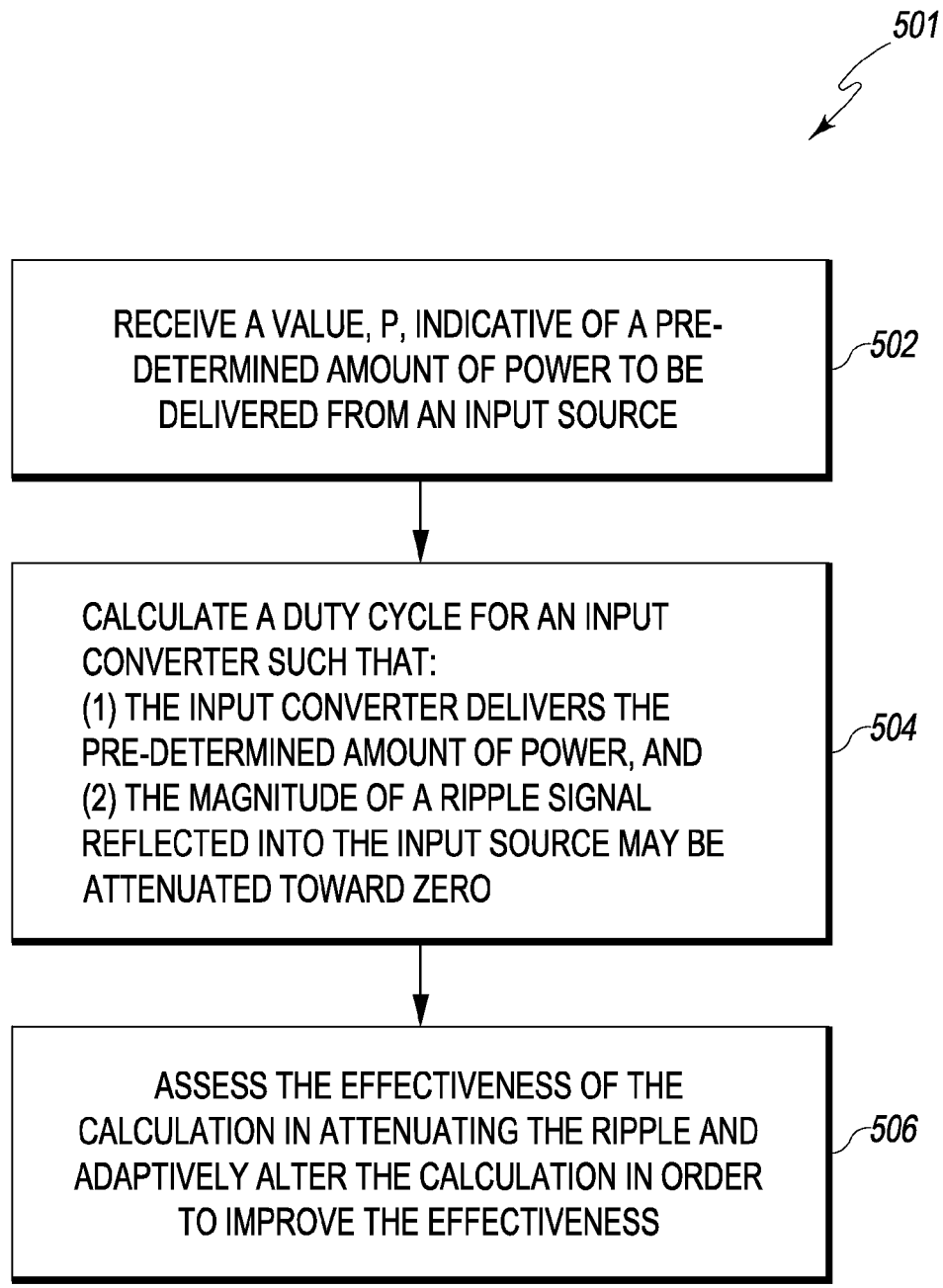
FIGS. 14 through 17 are simplified flow diagrams of methods for controlling an input converter of the inverter of FIGS. 1 and 9.

Referring now to FIG. 14, a flow diagram illustrating a method 501 of controlling an inverter of the kind that delivers power from a unipolar input source to an AC grid, and that comprises an input converter for delivering a pre-determined amount of power from the unipolar input source to a unipolar bus; an energy storage capacitor for supplying energy to and absorbing energy from the unipolar bus; an output converter for delivering power from the unipolar bus to the AC grid; and an inverter controller to control the operation of the input converter and the output converter. As previously discussed, the input converter and the output converter may, respectively, comprise a switching power converter, and the inverter controller may comprise an input converter controller for controlling the current delivered by the input converter and an output converter controller for controlling the power delivered by the output converter to the AC grid is shown.

As shown in FIG. 14, the method 501 begins with block 502 in which the input converter controller may receive a value, P, indicative of a pre-determined amount of power to be delivered from the input source. In block 504, the input converter controller may calculate a duty cycle for the input converter such that: (1) the input converter delivers the pre-determined amount of power, and (2) the magnitude of a ripple signal reflected into the input source may be attenuated toward zero. Additionally, in block 506, the input converter controller may assess the effectiveness of the calculation in attenuating the ripple and adaptively alter the calculation to improve the effectiveness.

Figure 15:
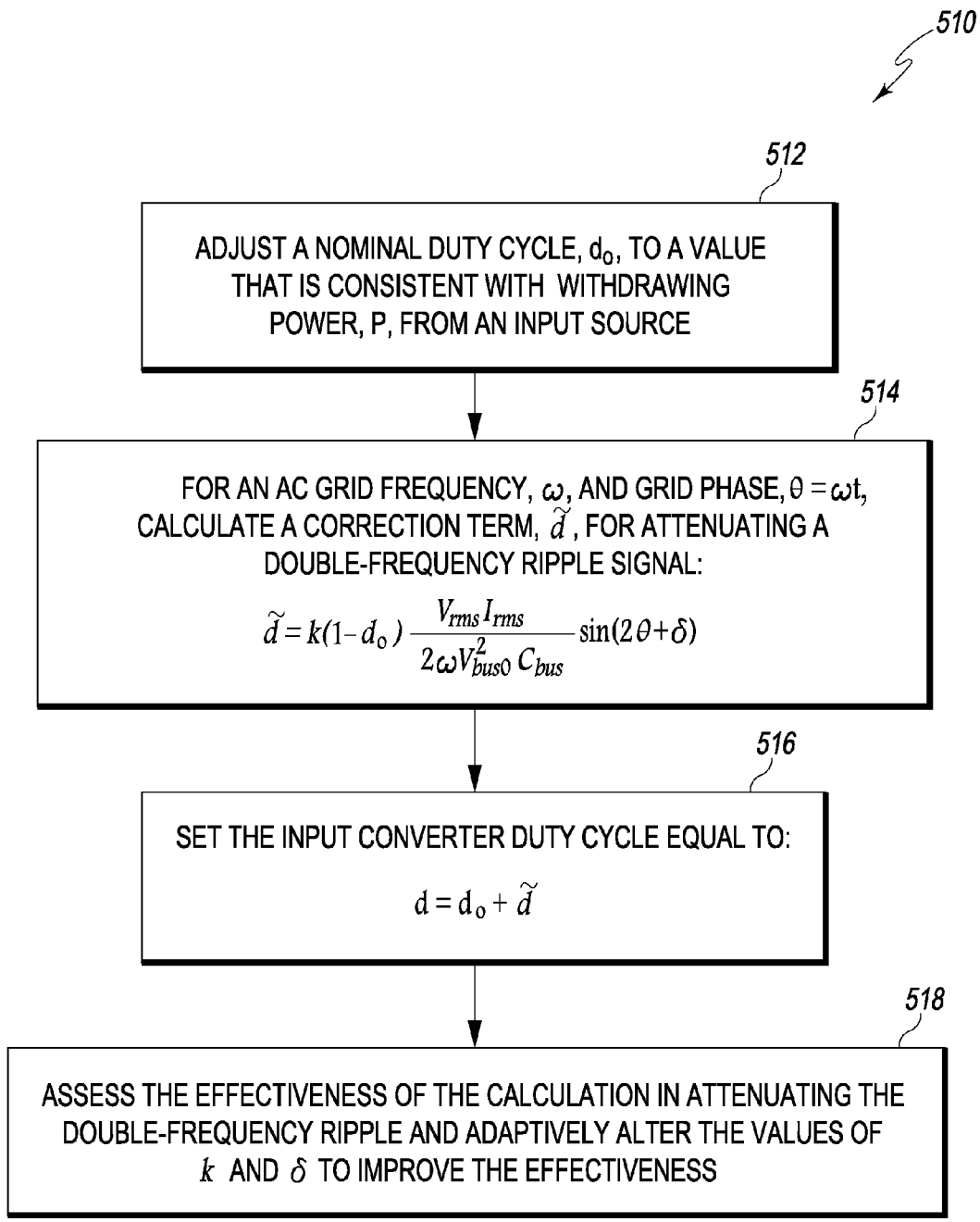

Referring to FIG. 15, one embodiment of a method 510 for calculating a duty cycle for the input converter, which may be executed in block 504 of method 501, is shown. The method 510 begins with block 512 in which a nominal duty cycle, $d_0$, is adjusted to a value that is consistent with drawing maximum power (e.g., P=$P_{mpp}$) from the input source. In block 514, for an AC grid frequency, ω, and grid phase, θ=ωt, a correction term, $$\tilde{d} = -k(1-d_0)\frac{V_{rms}I_{rms}}{2\omega V_{bus0}^2 C_{bus}}\sin(2\omega t + \delta),$$

is calculated for attenuating a double-frequency ripple signal. In block 514, the input converter duty cycle is set to d=$\tilde{d}$+$d_0$. Subsequently, in block 516, the effectiveness of the calculation in attenuating the double-frequency ripple and adaptively altering the values of k and δ to improve the effectiveness is assessed.

Figure 16:
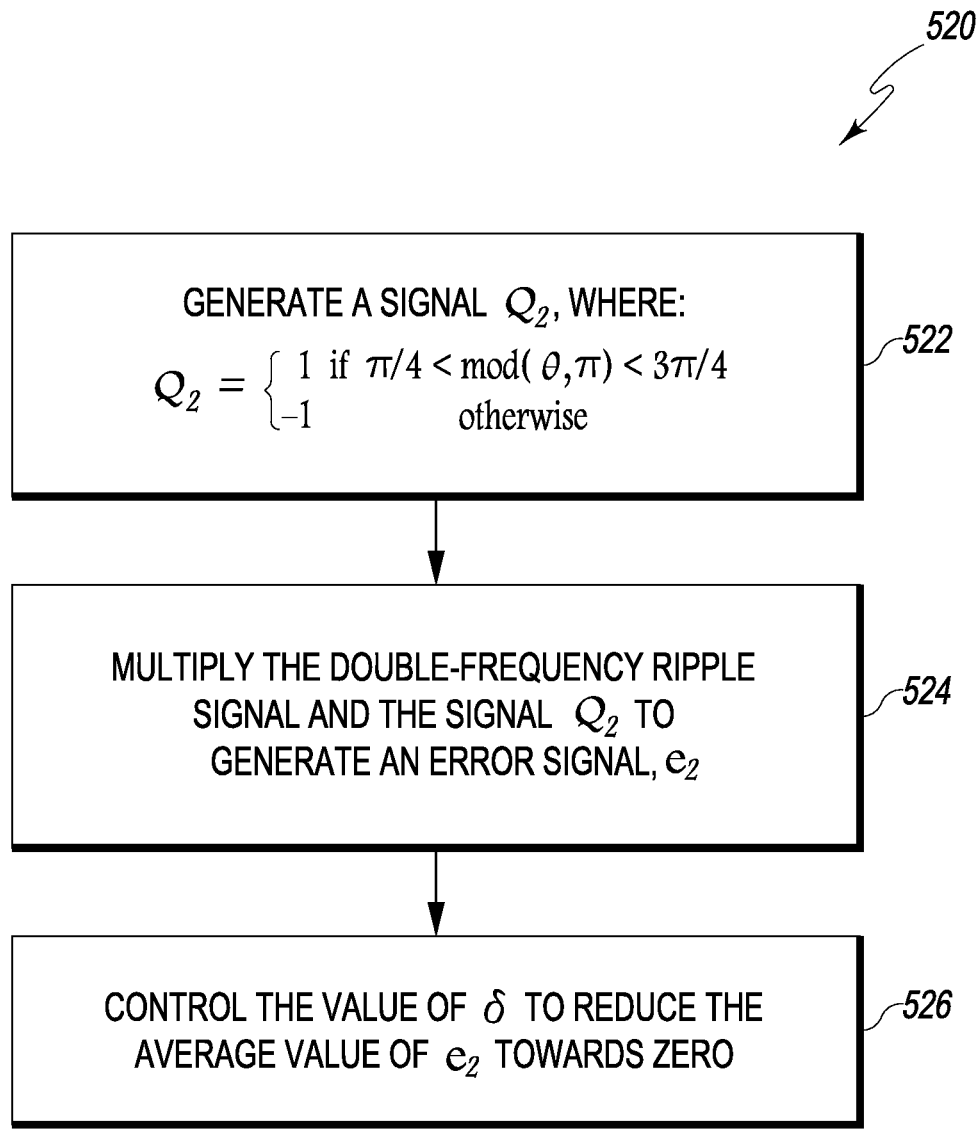

Referring now to FIG. 16, a method 520 for assessing the effectiveness of the calculation performed in the method of 510 may be used. The method 520 begins with block 522, in which a signal, $Q_2$, is generated according to:

$$Q_2 = \begin{cases} 1 & \text{if } \frac{\pi}{4} < \text{mod}(\omega t, \pi) < \frac{3\pi}{4} \\ -1 & \text{otherwise} \end{cases}.$$

In block 524, the double-frequency ripple signal is multiplied by the signal $Q_2$ to generate an error signal, $e_2$. Subsequently, in block 526, the value of δ is controlled to thereby reduce the average value of the error, $e_2$, towards zero.

Figure 17:
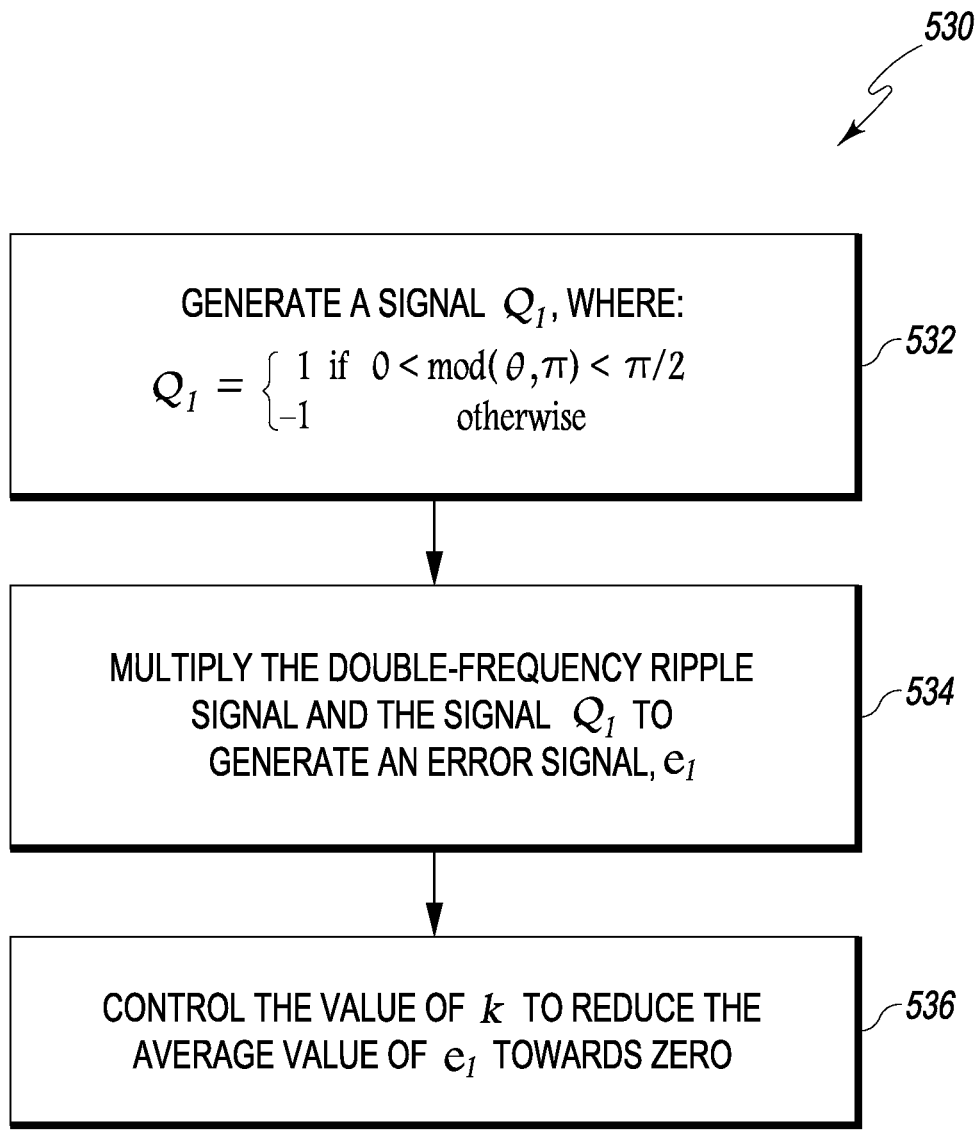

Referring now to FIG. 17, a method 530 for assessing the effectiveness of the calculation performed in the method of 510 may also be used. The method 530 begins with block 532 in which a signal, $Q_2$, is generated according to:

$$Q_1 = \begin{cases} 1 & \text{if } 0 < \text{mod}(\omega t, \pi) < \frac{\pi}{2} \\ -1 & \text{otherwise} \end{cases}.$$

In block 534, the double-frequency ripple signal is multiplied by the signal $Q_1$ to generate an error signal, $e_1$. Subsequently, in block 536, the value of k is controlled to reduce the average value of the error, $e_1$, towards zero.

The inverter, controllers, and methods described herein may be implemented as discrete circuits or in the form of software code and/or logical instructions that are processed by a microprocessor, digital processor, DSP or other means, or any combination thereof. The logical processes may run concurrently or sequentially with respect to each other or with respect to other processes, such as measurement processes and related calculations. Controllers may be implemented in mixed-signal circuitry; in circuitry comprising mixed-signal circuitry comprising a digital processor core; or in circuitry comprising a combination of mixed-signal circuitry and a separate digital signal processor. The controllers may be implemented as an integrated circuit or a hybrid device. There may also be additional logical processes that are not be shown for clarity of description, such as, e.g., safety and protection mechanisms; timing and frequency generation mechanisms; and hardware and processes related to regulatory requirements. Pre-determined values, such as, e.g., the value of used for $C_{bus}$ in Equation 19, may be stored in read-only or re-programmable non-volatile memory or other storage media. Communication means may also be incorporated into the inverter as a means of downloading commanded values or other operating information to the inverter and/or for uploading inverter operating information to user equipment.

Certain embodiments of the present disclosure have been described. Nevertheless, it will be understood that various modifications may be made without departing from the spirit and scope of the disclosure. For example, any of a wide variety of known non-resonant and resonant switching power converter topologies may be used in place of the specific converter embodiments described herein. The unipolar input source may be a fuel cell or another kind of DC source. The inverter controller may comprise elements for regulatory and safety monitoring and control (e.g., circuits or processes for disabling the inverter in the event of AC grid fault or input source fault; anti-islanding protection). Switches in power converters (e.g., switches 171-174, FIG. 9) are shown to be MOSFETs and to comprise diodes across their terminals. It is understood that other types of switches may be used (e.g., bipolar transistors, IGBTs) and that diodes may be intrinsic to the semiconductor switch or may be discrete devices. Switches may also be provided with passive or active snubbers to prevent losses and/or to limit voltage or current stresses.

There is a plurality of advantages of the present disclosure arising from the various features of the apparatuses, circuits, and methods described herein. It will be noted that alternative embodiments of the apparatuses, circuits, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present invention as defined by the appended claims.

The invention claimed is:

1. An apparatus for controlling the delivery of power from a unipolar input source to an alternating-current (AC) grid, the AC grid characterized by a grid voltage, $V_{rms}$, a nominal grid frequency $\omega$, and a grid phase $\theta$, the apparatus comprising:
an inverter including (i) an input converter configured to deliver power from the unipolar input source to a unipolar bus, (ii) an energy storage element coupled to the unipolar bus and configured to supply energy to and absorb energy from the unipolar bus, and (iii) an output converter coupled to the unipolar bus and configured to deliver power from the unipolar bus to the AC grid in the form of a substantially sinusoidal current at the grid frequency; and
an inverter controller coupled to the inverter, the inverter controller including (i) an output converter controller coupled to the output converter and configured to control the output converter to deliver power to the AC grid and (ii) an input converter controller coupled to the input converter and configured to control a duty cycle of the input converter to control delivery of a pre-determined amount of power from the input source to the unipolar bus,
wherein the input converter controller includes (i) means for setting a magnitude of the pre-determined amount of power, (ii) a feedforward controller configured to perform a calculation to determine a value for the duty cycle for the input converter such that: (1) the input converter delivers the pre-determined amount of power and (2) the magnitude of a ripple signal reflected into the input source is attenuated toward zero, and (iii) a quadrature corrector configured to determine the effectiveness of the calculation in attenuating the ripple and to adaptively alter the calculation to improve the effectiveness of the calculation.

2. The apparatus of claim 1, wherein the input source is a photovoltaic ("PV") cell and the means for setting a magnitude comprises a Maximum Power Point Tracking controller.

3. The apparatus of claim 1, wherein the energy storage element is a capacitor.

4. The apparatus of claim 1, wherein the ripple signal comprises a ripple component at a harmonic of the AC grid frequency.

5. The apparatus of claim 4, wherein the ripple signal comprises a second harmonic of the AC grid frequency.

6. The apparatus of claim 1, wherein the feedforward controller is configured to receive a signal, $d_0$, from the means for setting a magnitude, the signal $d_0$ being indicative of the duty cycle that is required to deliver the pre-determined amount of power.

7. The apparatus of claim 6, wherein:
the quadrature corrector is configured to deliver a phase correction term, $\delta$, and a gain correction term, $k$, to the feedforward controller, and
the feedforward controller calculates a duty cycle, $d$, of the form: $d = d_0 - k \cdot C \cdot$.

8. The apparatus of claim 7, wherein:
the energy storage element is a storage capacitor of value $C_{bus}$; and
the feedforward controller is configured to receive (i) measurements indicative of the value of the rms value of the AC grid voltage, $V_{rms}$, (ii) the rms value of the substantially sinusoidal current delivered by the output converter, $I_{rms}$, and (iii) the value of the unipolar bus voltage, $V_{bus0}$; and to set $$C = (1 - d_0) \frac{V_{rms} I_{rms}}{2\omega V_{bus0}^2 C_{bus}} \sin(2\omega t).$$

9. The apparatus of claim 7, wherein:
the energy storage element is a storage capacitor of value $C_{bus}$, and
the feedforward controller is configured to receive (i) a measurement indicative of the value of the power delivered by the inverter to the AC grid, $P_{out}$, and (ii) a value, $\phi$, indicative of a phase difference between the phase of the current delivered to the AC grid and the phase of the AC grid voltage; and to set $$C = (1 - d_0) \frac{P_{out}}{2\omega V_{bus0}^2 C_{bus} \cos(\phi)} \sin(2\omega t).$$

10. The apparatus of claim 7, wherein:
the energy storage element is a storage capacitor of value $C_{bus}$, and
the feedforward controller is configured to receive (i) a measurement indicative of the power delivered by the unipolar input source, $P_s$; (ii) a value, $\phi$, indicative of a phase difference between the phase of the current delivered to the AC grid and the phase of the AC grid voltage; and (iii) a value indicative of the operating efficiency of the inverter, $\eta$; and to set $$C = (1 - d_0) \frac{P_s}{2\omega V_{bus0}^2 C_{bus} \cos(\phi)} \sin(2\omega t).$$

11. The apparatus of claim 7, wherein:
the energy storage element is a storage capacitor of value $C_{bus}$; and
the feedforward controller is configured to receive (i) measurements indicative of the value of the voltage delivered by the unipolar input source, $V_s$, (ii) measurements indicative of the value of the current delivered by the unipolar input source, $I_s$, (iii) a value, $\phi$, indicative of a phase difference between the phase of the current delivered to the AC grid and the phase of the AC grid voltage, and (iv) a value indicative of the operating efficiency of the inverter, $\eta$; and to set $$C = (1 - d_0) \frac{V_s I_s}{2\omega V_{bus0}^2 C_{bus} \cos(\phi)} \sin(2\omega t).$$

12. The apparatus of claim 7, wherein the quadrature corrector comprises a first low pass filter, the first low pass filter being configured to receive a measurement indicative of the magnitude of an input current delivered by the unipolar input source, $i_{in}$, and to deliver a double-frequency signal, $\tilde{i}_{in}$, indicative of the magnitude of the component of the input current ripple that is twice the frequency of the AC grid frequency.

13. The apparatus of claim 12, wherein the quadrature corrector further comprises a phase error detector configured to generate a phase error signal based upon a difference between the phase of the double-frequency signal and the grid phase, θ,
wherein the phase error signal has a zero average value when said difference is substantially zero.

14. The apparatus of claim 13, wherein the phase error detector comprises:
a first phase comparator that receives a signal indicative of the grid phase, θ, and delivers a signal, $Q_2$, such that:

$$Q_2 = \begin{cases} 1 & \text{if } \frac{\pi}{4} < \text{mod}(\theta, \pi) < \frac{3\pi}{4} \\ -1 & \text{otherwise} \end{cases};$$

a first multiplier that delivers a phase error signal, $e_2 = Q_2 \tilde{i}_{in}$;
a second low pass filter configured to deliver a signal $\overline{e_2}$ indicative of the average value of $e_2$; and
a first proportional-integral filter configured to receive $\overline{e_2}$ and deliver the phase correction term, δ.

15. The apparatus of claim 14, wherein the quadrature corrector further comprises a gain error detector that generates a gain error signal based upon the magnitude of the double-frequency signal,
wherein the gain error signal has a zero average value when said magnitude is substantially zero.

16. The apparatus of claim 15, wherein the gain error detector comprises:
a second phase comparator that receives a signal indicative of the phase of the AC grid and delivers a signal:

$$Q_1 = \begin{cases} 1 & \text{if } 0 < \text{mod}(\theta, \pi) < \frac{\pi}{2} \\ -1 & \text{otherwise} \end{cases};$$

a second multiplier that delivers a gain error signal, $e_1 = Q_1 \tilde{i}_{in}$;
a third low pass filter configured to deliver a signal $\overline{e_1}$ indicative of the average value of $e_1$; and
a second proportional-integral filter configured to receive $\overline{e_1}$ and deliver the gain correction term, k.

17. The apparatus of claim 1, wherein the input converter is a current-controlled converter.

18. The apparatus of claim 1, wherein the input converter is a boost switching power converter.

19. The apparatus of claim 18, wherein the boost switching power converter comprises an isolation transformer for providing galvanic isolation between the input source and the unipolar bus.

20. The apparatus of claim 1, wherein the output converter controller is configured to control the output converter to deliver power to the AC grid in the form of a substantially sinusoidal current at the grid frequency.

21. The apparatus of claim 1, further comprising an output filter connected between the output converter and the AC grid.

22. The apparatus of claim 1, wherein the average power delivered to the AC grid by the output converter is controlled by the output converter controller to be substantially equal to the power delivered by the unipolar source less the substantial total of the power losses in the inverter.

23. The apparatus of claim 1, wherein the power delivered to the grid is controlled by the output controller to comprise an average power component and a time-varying power component.

24. The apparatus of claim 23, wherein the output converter controller is configured to comprise a feedforward controller configured to receive:
a measurement of the power delivered to the input converter by the unipolar input source, $P_S$,
a measurement of the rms grid voltage, $V_{rms}$,
a measurement of the grid phase, θ,
a pre-determined setpoint value of a power factor angle, φ,
and wherein the feedforward controller controls the output converter to deliver to the AC grid a time-varying component of current essentially equal to:

$$i_{LFF}(t) = (\sqrt{2} \cdot P_S / V_{rms}) \cdot (\cos(\theta + \phi) / \cos(\phi)).$$

25. The apparatus of claim 24, wherein:
the energy storage element is a capacitor, $C_{bus}$, and
the output converter controller comprises a feedback controller that receives (i) a measurement of the average voltage across the unipolar bus, $V_{bus0}$, and (ii) a pre-determined setpoint value indicative of a desired average value of the unipolar bus voltage, $V_{bus}^*$,
wherein the feedback controller controls the output converter to deliver to the AC grid an additional time-varying component of current, which, when combined with $i_{LFF}(t)$, causes $V_{bus0}$ to be substantially equal to $V_{bus}^*$.

26. The apparatus of claim 25, wherein the output converter controller is configured to alter the magnitude of $V_{bus}^*$ as a function of selected inverter operating conditions.

27. The apparatus of claim 26, wherein the selected inverter operating conditions comprise the operating power of the converter and the AC grid voltage.

28. The apparatus of claim 25, wherein the output converter controller comprises a filter that receives a measurement of the voltage across the unipolar bus, $V_{bus}$, and delivers the measurement of the average voltage across the unipolar bus, $V_{bus0}$.

29. The apparatus of claim 28, wherein the filter comprises a low-frequency rolloff filter having a pole at a frequency equal to one-tenth of the grid frequency.

30. The apparatus of claim 1, wherein the output converter comprises a full-bridge switching circuit comprising controllable switches configured to receive power from the unipolar bus and deliver power to the AC grid.

31. A method for controlling an inverter that is configured to deliver power from a unipolar input source to an alternating-current ("AC") grid at a grid voltage and grid phase, comprising:
delivering a pre-determined amount of power from the unipolar input source to a unipolar bus using an input converter;
supplying energy to and absorbing energy from the unipolar bus using an energy storage capacitor;
delivering power from the unipolar bus to the AC grid using an output converter; and
controlling the operation of the inverter using an inverter controller, wherein controlling the operation of the inverter comprises:
(i) calculating a duty cycle for the input converter such that (a) the input converter delivers the pre-determined amount of power and (b) the magnitude of a ripple signal reflected into the input source may be attenuated toward zero, and
(ii) determining the effectiveness of the calculation in attenuating the ripple and adaptively altering the calculation to improve the effectiveness of the calculation.

32. The method of claim 31, wherein:
delivering the predetermined amount of power comprises delivering the predetermined amount of power from the unipolar input source to the unipolar bus using an input converter comprising a switching power converter, and
controlling the operation of the input converter comprises controlling the input converter using an input converter controller of the inverter controller.

33. The method of claim 31, wherein:
delivering power from the unipolar bus to the AC grid comprises delivering power from the unipolar bus to the AC grid using an output converter comprising a switching power converter, and
controlling the operation of the output converter comprises controlling the output converter using an output converter controller of the inverter controller to deliver power to the AC grid.

34. The method of claim 31, wherein the energy storage element comprises a bus capacitor and the input converter comprises a switching power converter, and wherein controlling the input converter comprises:
providing to the inverter controller:
a value indicative of the size of the bus capacitor, $C_{bus}$,
a value indicative of the grid frequency, $\omega$,
a measurement of the rms grid voltage, $V_{rms}$,
a measurement of the rms inverter output current, $I_{rms}$,
a measurement of the unipolar bus voltage, $V_{bus0}$,
a measurement of the grid phase, $\theta$;
calculating a duty cycle for the input converter by:
adjusting a nominal duty cycle, $d_0$, to a value that is consistent with delivering the pre-determined amount of power,
calculating a correction term, $\tilde{d}$, for attenuating a reflected ripple signal, $\tilde{i}_r$, at a frequency $2\omega$:

$$\tilde{d} = k(1-d_0)\frac{V_{rms}I_{rms}}{2\omega V_{bus0}^2 C_{bus}}\sin(2\omega t + \delta),$$

and
setting the input converter duty cycle equal to:

$$d = \tilde{d} + d_0;$$

and
assessing the effectiveness of the calculation of the correction term in attenuating the said reflected ripple signal and adaptively altering the values of k and $\delta$ to improve the effectiveness.

35. The method of claim 34, wherein assessing the effectiveness comprises:
generating a signal, $Q_1$:

$$Q_1 = \begin{cases} 1 & \text{if } 0 < \text{mod}(\theta, \pi) < \frac{\pi}{2} \\ -1 & \text{otherwise} \end{cases};$$

multiplying $Q_1$ and the reflected ripple signal to generate an error signal, $$e_1 = Q_1 \tilde{i}_{in};$$

and
controlling the value of k to reduce the average value of $e_1$ towards zero.

36. The method of claim 34, wherein assessing the effectiveness comprises:
generating a signal, $Q_2$:

$$Q_2 = \begin{cases} 1 & \text{if } \frac{\pi}{4} < \text{mod}(\theta, \pi) < \frac{3\pi}{4} \\ -1 & \text{otherwise} \end{cases};$$

multiplying $Q_2$ and the reflected ripple signal to generate an error signal, $$e_2 = Q_2 \tilde{i}_r;$$

and
controlling the value of $\delta$ to reduce the average value of $e_2$ towards zero.

37. The method of claim 31, wherein the energy storage element comprises a bus capacitor, the input converter comprises a switching power converter and controlling the input converter comprises:
providing to the inverter controller:
a value indicative of the size of the bus capacitor, $C_{bus}$,
a value indicative of the grid frequency, $\omega$,
a value, $\phi$, indicative of a phase difference between the phase of the current delivered to the AC grid and the phase of the AC grid voltage,
a measurement of the inverter output power, $P_{out}$,
a measurement of the unipolar bus voltage, $V_{bus0}$,
a measurement of the grid phase, $\theta$;
calculating a duty cycle for the input converter by:
adjusting a nominal duty cycle, $d_0$, to a value that is consistent with delivering the pre-determined amount of power,
calculating a correction term, $\tilde{d}$, for attenuating a reflected ripple signal, $\tilde{i}_r$, at a frequency $2\omega$:

$$\tilde{d} = k(1-d_0)\frac{P_{out}}{2\omega V_{bus0}^2 C_{bus}\cos(\phi)}\sin(2\omega t + \delta),$$

and
setting the input converter duty cycle equal to:

$$d = \tilde{d} + d_0;$$

and
assessing the effectiveness of the calculation of the correction term in attenuating the said reflected ripple signal and adaptively altering the values of k and $\delta$ to improve the effectiveness.

38. The method of claim 31, wherein the energy storage element comprises a bus capacitor, the input converter comprises a switching power converter and controlling the input converter comprises:
providing to the inverter controller:
a value indicative of the size of the bus capacitor, $C_{bus}$,
a value indicative of the grid frequency, $\omega$,
a value indicative of the operating efficiency of the inverter, $\eta$,
a value, $\phi$, indicative of a phase difference between the phase of the current delivered to the AC grid and the phase of the AC grid voltage,
a measurement of the power delivered by the unipolar input source, $P_s$,
a measurement of the unipolar bus voltage, $V_{bus0}$,
a measurement of the grid phase, $\theta$; and calculating a duty cycle for the input converter by:
adjusting a nominal duty cycle, $d_0$, to a value that is consistent with delivering the pre-determined amount of power,
calculating a correction term, $\tilde{d}$, for attenuating a reflected ripple signal, $\tilde{i}_r$, at a frequency $2\omega$:

$$\tilde{d} = k(1-d_0)\frac{P_s}{2\omega V_{bus0}^2 C_{bus}\cos(\phi)}\sin(2\omega t + \delta),$$

and
setting the input converter duty cycle equal to:

$d = \tilde{d} + d_0;$ and
assessing the effectiveness of the calculation of the correction term in attenuating the said reflected ripple signal and adaptively altering the values of k and δ to improve the effectiveness.

39. The method of claim 31, wherein the energy storage element comprises a bus capacitor, the input converter comprises a switching power converter and controlling the input converter comprises:
providing to the inverter controller:
a value indicative of the size of the bus capacitor, $C_{bus}$,
a value indicative of the grid frequency, $\omega$,
a value indicative of the operating efficiency of the inverter, $\eta$,
a value, $\phi$, indicative of a phase difference between the phase of the current delivered to the AC grid and the phase of the AC grid voltage,
a measurement of the voltage delivered by the unipolar input source, $V_s$,
a measurement of current delivered by the unipolar input source, $I_s$,
a measurement of the unipolar bus voltage, $V_{bus0}$,
a measurement of the grid phase, $\theta$; and
calculating a duty cycle for the input converter by:
adjusting a nominal duty cycle, $d_0$, to a value that is consistent with delivering the pre-determined amount of power;
calculating a correction term, $\tilde{d}$, for attenuating a reflected ripple signal, $\tilde{i}_r$, at a frequency $2\omega$:

$$\tilde{d} = k(1-d_0)\frac{V_s I_s}{2\omega V_{bus0}^2 C_{bus}\cos(\phi)}\sin(2\omega t + \delta),$$

and
setting the input converter duty cycle equal to:

$d = \tilde{d} + d_0;$ and
assessing the effectiveness of the calculation of the correction term in attenuating the said reflected ripple signal and adaptively altering the values of k and δ to improve the effectiveness.

* * * * *